US 9,179,197 B2

United States Patent
Beckhardt et al.

(10) Patent No.: US 9,179,197 B2
(45) Date of Patent: Nov. 3, 2015

(54) METHODS AND APPARATUS FOR MULTICAST OPTIMIZATION

(71) Applicant: Sonos, Inc., Santa Barbara, CA (US)

(72) Inventors: Steven Beckhardt, Boston, MA (US); Hrishikesh Gossain, Santa Barbara, CA (US); Nicholas A. J. Millington, Santa Barbara, CA (US); Jeffrey M. Peters, Leominster, MA (US)

(73) Assignee: Sonos, Inc., Santa Barbara, CA (US)

( * ) Notice: Subject to any disclaimer, the term of this patent is extended or adjusted under 35 U.S.C. 154(b) by 277 days.

(21) Appl. No.: 13/648,486

(22) Filed: Oct. 10, 2012

(65) Prior Publication Data

US 2014/0098713 A1    Apr. 10, 2014

(51) Int. Cl.
| | |
|---|---|
| *H04L 12/44* | (2006.01) |
| *H04N 21/6408* | (2011.01) |
| *H04N 21/426* | (2011.01) |
| *H04N 21/436* | (2011.01) |
| *H04N 21/61* | (2011.01) |
| *H04N 21/6402* | (2011.01) |
| *H04N 21/6405* | (2011.01) |

(52) U.S. Cl.
CPC ...... *H04N 21/6408* (2013.01); *H04N 21/42684* (2013.01); *H04N 21/43615* (2013.01); *H04N 21/6125* (2013.01); *H04N 21/6402* (2013.01); *H04N 21/6405* (2013.01)

(58) Field of Classification Search
None
See application file for complete search history.

(56) References Cited

U.S. PATENT DOCUMENTS

| | | | |
|---|---|---|---|
| 5,923,902 A | 7/1999 | Inagaki | |
| 6,256,554 B1 | 7/2001 | DiLorenzo | |
| 6,317,789 B1 | 11/2001 | Rakavy et al. | |
| 6,366,582 B1 | 4/2002 | Nishikado et al. | |
| 6,404,811 B1 | 6/2002 | Cvetko et al. | |
| 6,522,886 B1 | 2/2003 | Youngs et al. | |
| 6,611,502 B1* | 8/2003 | Seaman | 370/256 |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |

(Continued)

FOREIGN PATENT DOCUMENTS

| | | |
|---|---|---|
| KR | 100794622 | 1/2008 |
| KR | 20110037680 | 4/2011 |

(Continued)

OTHER PUBLICATIONS

Voyetra Turtle Beach, Inc.,"AudioTron Quick Start Guide, Version 1.0", Mar. 2001, 24 pages.

(Continued)

*Primary Examiner* — Sulaiman Nooristany

(57) ABSTRACT

Certain examples accommodate multicast and unicast frame forwarding via wired and/or wireless port connections. An example method includes identifying a message including a frame of data to be directed to a group of playback devices via a network protocol. The example method includes overriding the network protocol for the group of playback devices to transmit a unicast message via direct routing to each member of the group of playback devices that is a "neighbor" of the first playback device.

19 Claims, 14 Drawing Sheets

(56) References Cited

U.S. PATENT DOCUMENTS

| | | | |
|---|---|---|---|
| 7,483,538 | B2 | 1/2009 | McCarty et al. |
| 7,571,014 | B1 | 8/2009 | Lambourne et al. |
| 7,643,894 | B2 | 1/2010 | Braithwaite et al. |
| 7,657,910 | B1 | 2/2010 | McAulay et al. |
| 7,668,925 | B1 | 2/2010 | Liao et al. |
| 7,853,341 | B2 | 12/2010 | McCarty et al. |
| 8,014,423 | B2 | 9/2011 | Thaler et al. |
| 8,045,952 | B2 | 10/2011 | Qureshey et al. |
| 8,050,203 | B2 | 11/2011 | Jacobsen et al. |
| 8,103,009 | B2 | 1/2012 | McCarty et al. |
| 8,234,395 | B2 | 7/2012 | Millington |
| 8,289,949 | B2 * | 10/2012 | Hiie et al. .................. 370/351 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0097718 | A1 * | 7/2002 | Korus et al. .................. 370/390 |
| 2002/0124097 | A1 | 9/2002 | Isely et al. |
| 2002/0126670 | A1 * | 9/2002 | Yamauchi et al. ............ 370/390 |
| 2003/0157951 | A1 | 8/2003 | Hasty, Jr. |
| 2004/0024478 | A1 | 2/2004 | Hans et al. |
| 2004/0190454 | A1 * | 9/2004 | Higasiyama .................. 370/238 |
| 2005/0135304 | A1 | 6/2005 | Wentink et al. |
| 2006/0050656 | A1 * | 3/2006 | Perrot et al. .................. 370/255 |
| 2006/0209785 | A1 | 9/2006 | Iovanna et al. |
| 2006/0264227 | A1 | 11/2006 | Takahashi et al. |
| 2007/0127367 | A1 * | 6/2007 | Ogasahara et al. ........... 370/226 |
| 2007/0133531 | A1 * | 6/2007 | Kodama et al. ............... 370/390 |
| 2007/0142944 | A1 | 6/2007 | Goldberg et al. |
| 2008/0025535 | A1 | 1/2008 | Rajapakse |
| 2008/0075076 | A1 * | 3/2008 | Shimada ...................... 370/389 |
| 2008/0151890 | A1 * | 6/2008 | Zelig et al. ................... 370/390 |
| 2008/0189359 | A1 | 8/2008 | Sasaki et al. |
| 2010/0034393 | A1 | 2/2010 | Sorek et al. |
| 2010/0135297 | A1 * | 6/2010 | Brousard et al. .............. 370/390 |
| 2010/0275244 | A1 | 10/2010 | Lor et al. |
| 2010/0290469 | A1 * | 11/2010 | Assarpour .................... 370/392 |
| 2011/0069720 | A1 | 3/2011 | Jacobs et al. |
| 2011/0080855 | A1 * | 4/2011 | Fung ............................ 370/256 |
| 2011/0149768 | A1 | 6/2011 | Kang et al. |
| 2011/0211511 | A1 | 9/2011 | Bakthavathsalu et al. |
| 2012/0093152 | A1 | 4/2012 | Singh et al. |
| 2012/0147268 | A1 | 6/2012 | Hassan et al. |
| 2013/0173794 | A1 | 7/2013 | Agerbak et al. |
| 2013/0301429 | A1 | 11/2013 | Peters et al. |

FOREIGN PATENT DOCUMENTS

| | | |
|---|---|---|
| WO | 0011908 | 3/2000 |
| WO | 0153994 | 7/2001 |
| WO | 2007067550 A2 | 6/2007 |

OTHER PUBLICATIONS

Voyetra Turtle Beach, Inc.,"AudioTron Reference Manual, Version 3.0", May 2002, 70 pages.

Voyetra Turtle Beach, Inc., "AudioTron Setup Guide, Version 3.0", May 2002, 38 pages.

International Bureau, "International Search Report and Written Opinion", issued in connection with Application No. PCT/US2013/045643, mailed on Feb. 19, 2014, 14 pages.

International Bureau ,"International Search Report", issued in connection with PCT Application No. PCT/US2013/047913, mailed on Oct. 16, 2013, 5 pages.

Jo J., et al., "Synchronized One-to-many Media Streaming with Adaptive Playout Control," Proceedings of SPIE, 2002, vol. 4861, pp. 71-82.

International Bureau, "The International Search Report and Written Opinion", issued in connection with Application No. PCT/US2013/039494, mailed on Aug. 21, 2013,12 pages.

UPnP; "Universal Plug and Play Device Architecture"; Jun. 8, 2000; version 1.0; Microsoft Corporation; pp. 1-54.

International Bureau,"Written Opinion", issued in connection with PCT Application No. PCT/US2013/047913, mailed on Oct. 16, 2013, 5 pages.

Bluetooth, "Specification of the Bluetooth System: The as hoc SCATTERNET for affordable and highly functional wireless connectivity", Core, Version 1.0 A, Jul. 26, 1999, 1068 pages.(Document uploaded in 7 different files: NPL1_part1 pp. 1 to 150, NPL1_part2 pp. 151 to 300, NPL1_part3 pp. 301 to 450, NPL1_part4 pp. 451 to 600,NPL1_part5 pp. 601 to 750, NPL1_pp. 751 to 900 and NPL1_part7 pp. 901 to 1068.

Bluetooth. "Specification of the Bluetooth System: Wireless connections made easy" Core, Version 1.0 B, Dec. 1, 1999, 1081 pages. (Document uploaded in 8 different files: NPL2_part1 pp. 1 to 150, NPL2_part2 pp. 151 to 303, NPL2_part3 pp. 304 to 453, NPL2_part4 pp. 454 to 603,NPL2_part5 pp. 604 to 703, NPL2_part6 pp. 704 to 854 and NPL2_part7 pp. 855 to 1005, NPL2_part8 pp. 1006 to 1081).

Dell, Inc., "Dell Digital Audio Receiver: Reference Guide" Jun. 2000, 70 pages.

Dell, "Start Here" Jun. 2000, 2 pages.

Jones, Stephen. "Dell Digital Audio Receiver: Digital upgrade for your analog stereo" Analog Stereo. Jun. 24, 2000 < http://www.reviewsonline.com/articles/961906864.htm> retrieved Jun. 18, 2014, 2 pages.

Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages.

Palm, Inc. "Handbook for the Palm VII Handheld" May 2000, 311 pages.

Higgins et al., "Presentations at WinHEC 2000" May 2000, 138 pages.

* cited by examiner

METHODS AND APPARATUS FOR MULTICAST OPTIMIZATION

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
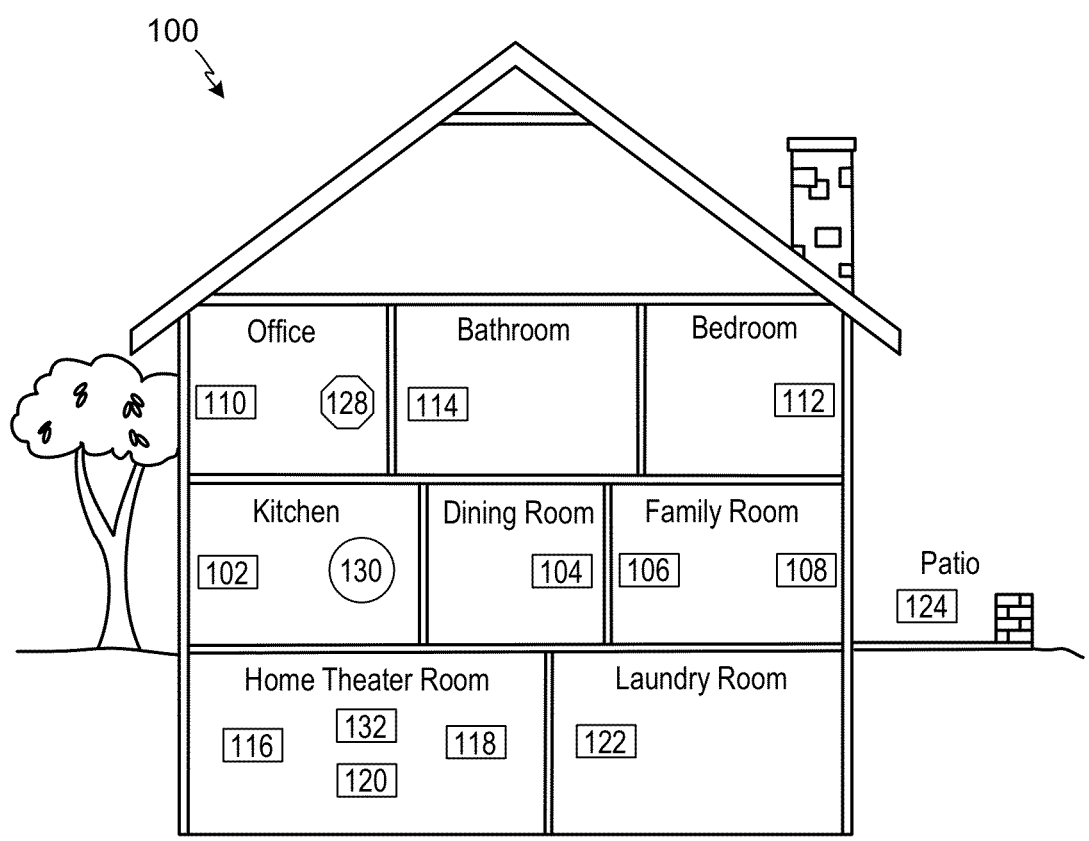
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

The present disclosure provides various mechanisms that optimize multicast data routing in an audio network. In an embodiment, the audio network uses a wireless (or wired, or both wireless and wired) mesh network that allows devices, such as zone players, and access points to communicate with each other. Additionally, the network system generally uses a network protocol like a Spanning Tree Protocol (STP) to provide certain benefits, such as to prevent routing loops, but is optimized for an audio system. In an embodiment, a networked audio component, such as a zone player, can override the use of the STP protocol in view of a direct routing scheme, described herein, to optimize certain kinds of multicast traffic.

Particularly, to prevent a routing loop, the STP or similar network protocols, restrict data transmission capabilities of some devices on a network. For example, a first zone player (e.g., represented as a node in an audio network) of an STP network may be blocked, per the protocol, from sending data directly to a second zone player of the STP network. In other words, the first zone player is required to send data destined for the second zone player through an intermediary device, such as a third zone player (e.g., a root node).

Devices of a network that are restricted by a governing protocol, like STP, from transmitting data directly with certain other devices of the network are referred to herein as "blocked." That is, when the network protocol prohibits the first device of the network from directly routing data to the second device, the direct routing (or direct link) between the first and second devices is said to be blocked by the governing network protocol.

Example methods, apparatus, systems, and articles of manufacture disclosed herein provide devices, such as a zone player, with an ability to directly route data, such as audio data, to neighboring devices despite the protocol designation of the link as "blocked." As described in greater detail below, example methods, apparatus, systems, and articles of manufacture disclosed herein create a direct routing path between a first device and a second device where the first device is otherwise blocked (e.g., according to a designation of the governing protocol) from routing data to the second device.

The direct routing scheme provided by the example methods, apparatus, systems, and articles of manufacture disclosed herein enables the first device to bypass the indirect forwarding route established by the governing protocol, thereby transmitting the forwarded information to a destination device faster and with less network congestion. In an embodiment, the direct route provided by the example methods, apparatus, systems, and articles of manufacture disclosed herein is used in connection with forwarding data (e.g., frames) of a certain type of frame, such as frames having a threshold quality of service (QoS) characteristic(s). In another embodiment, the direct routing scheme is used for data carrying audio content when possible, whereas the governing protocol is followed for other types of data. In yet another embodiment, the direct routing scheme is used by devices on the audio network, such as zone players, to forward multicast traffic using a unicast transmission methodology when possible.

In some examples disclosed herein, one or more characteristics indicative of the connection quality between the first and second devices is monitored. For example, a wireless signal-to-noise level (SNR), also referred to herein as signal strength indicator (SSI), between the first and second devices is monitored to determine a health and/or a measure of reliability of the direct link between the first and second devices. Direct routing may be used, or considered, when the health of the connection meets a certain threshold.

If the monitored characteristic(s) indicate a weakness of the connection, the direct routing between the otherwise blocked devices is disabled. As a result, the first device communicates with the second device in accordance with the governing protocol's "blocked" designation until the monitored characteristic(s) indicate that the connection between the first and second devices has returned to a healthy, reliable state.

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

These embodiments and many additional embodiments are described more below. Further, the detailed description is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments.

II. An Example Operating Environment

Referring now to the drawings, in which like numerals can refer to like parts throughout the figures, FIG. 1 shows an example system configuration 100 in which one or more embodiments disclosed herein can be practiced or implemented.

By way of illustration, the system configuration 100 represents a home with multiple zones, though the home could have been configured with only one zone. Each zone, for example, may represent a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the system configuration 100. Controller 130 may be fixed to a zone, or alternatively, mobile such that it can be moved about the zones. System configuration 100 may also include more than one controller 130. The system configuration 100 illustrates an example whole house audio system, though it is understood that the technology described herein is not limited to its particular place of application or to an expansive system like a whole house audio system 100 of FIG. 1.

a. Example Zone Players

Figure 2A:
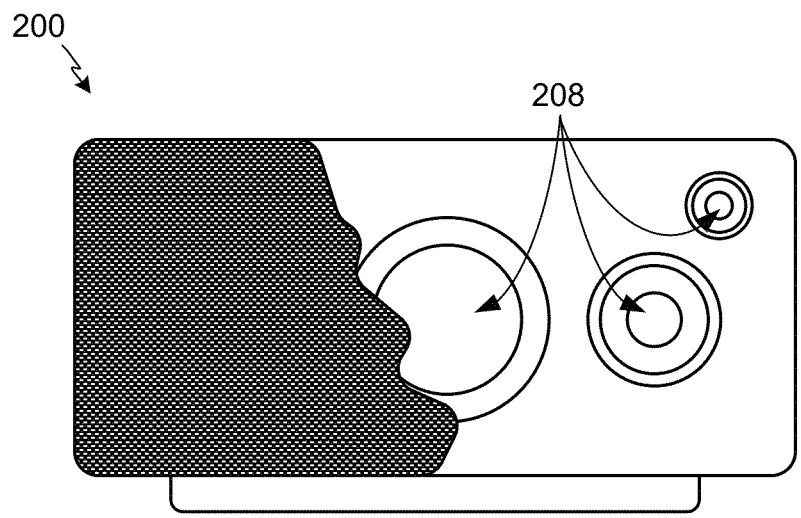
FIG. 2A shows an illustration of an example zone player having a built-in amplifier and speakers.
Figure 2B:
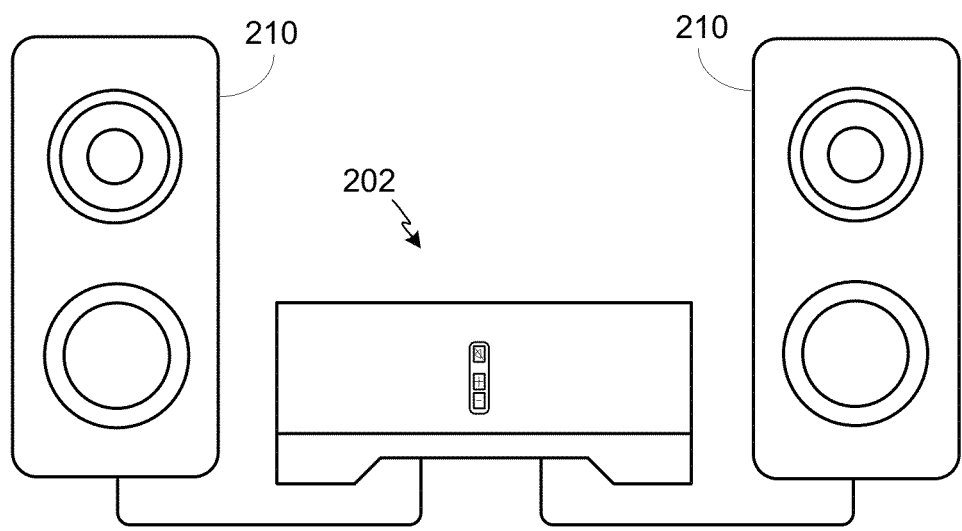
FIG. 2B shows an illustration of an example zone player having a built-in amplifier and connected to external speakers.
Figure 2C:
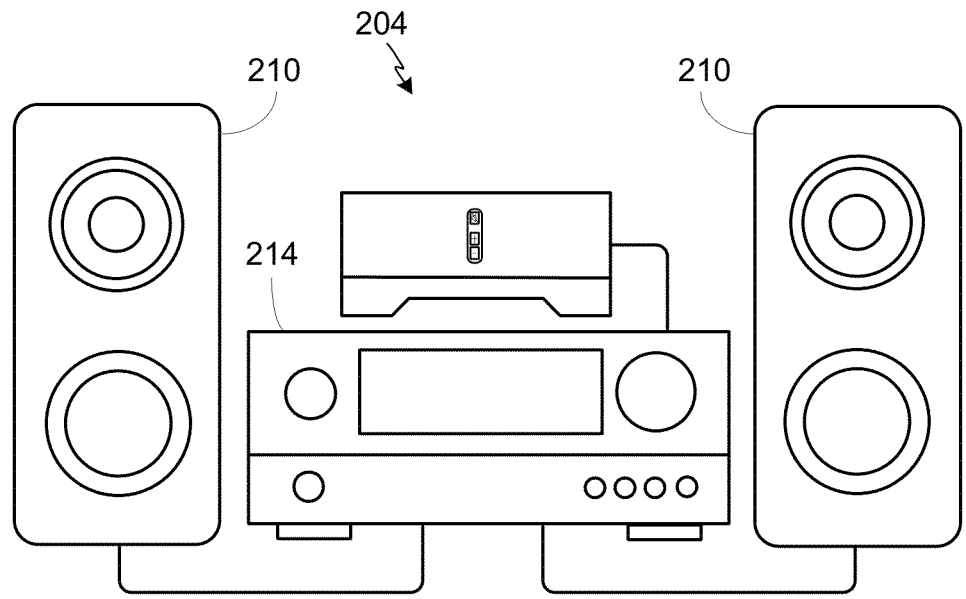
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
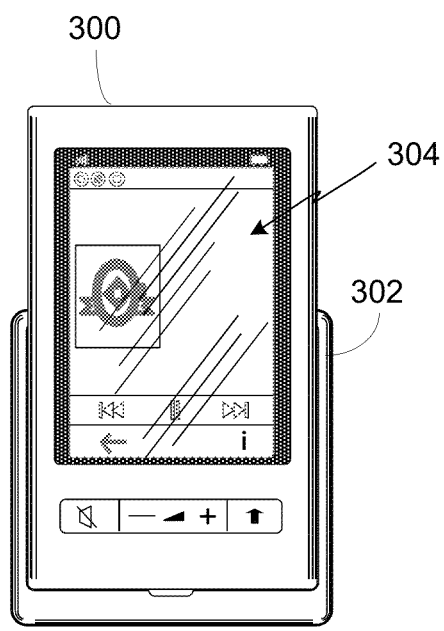
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE®, IPAD®, ANDROID™ powered phone, or any other smart phone or network-enabled device can be used as controller 130. An application running on a laptop or desktop personal computer (PC) or MAC™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE®," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
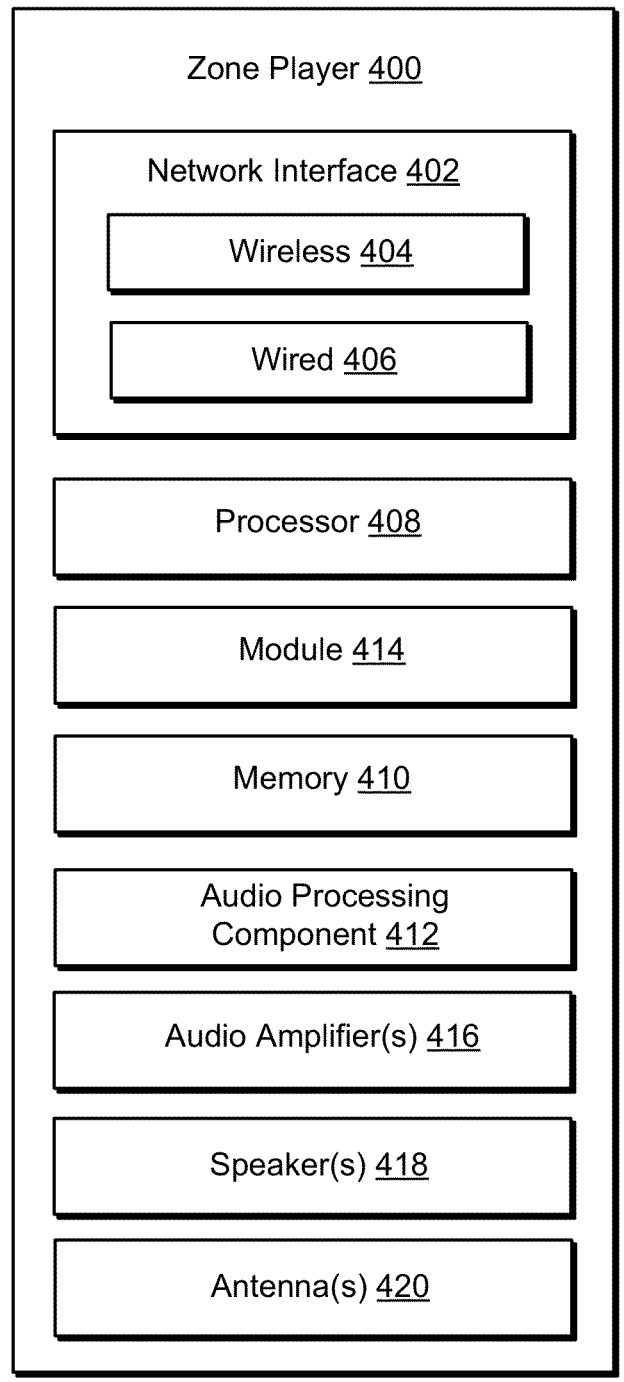
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5.

IV. Example Controller

Figure 5:
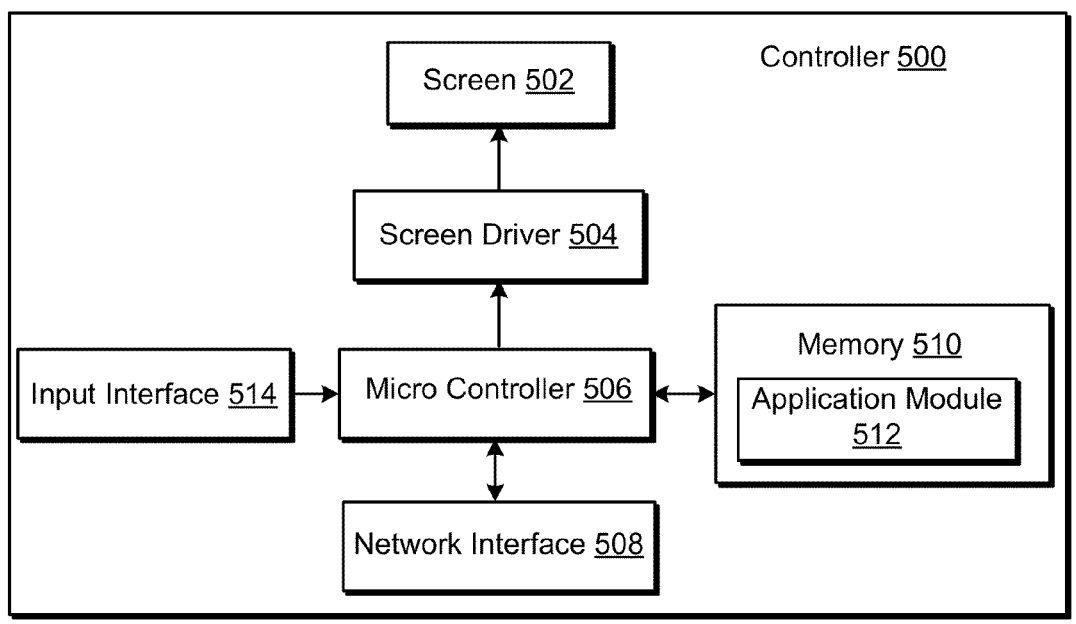
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or MAC®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
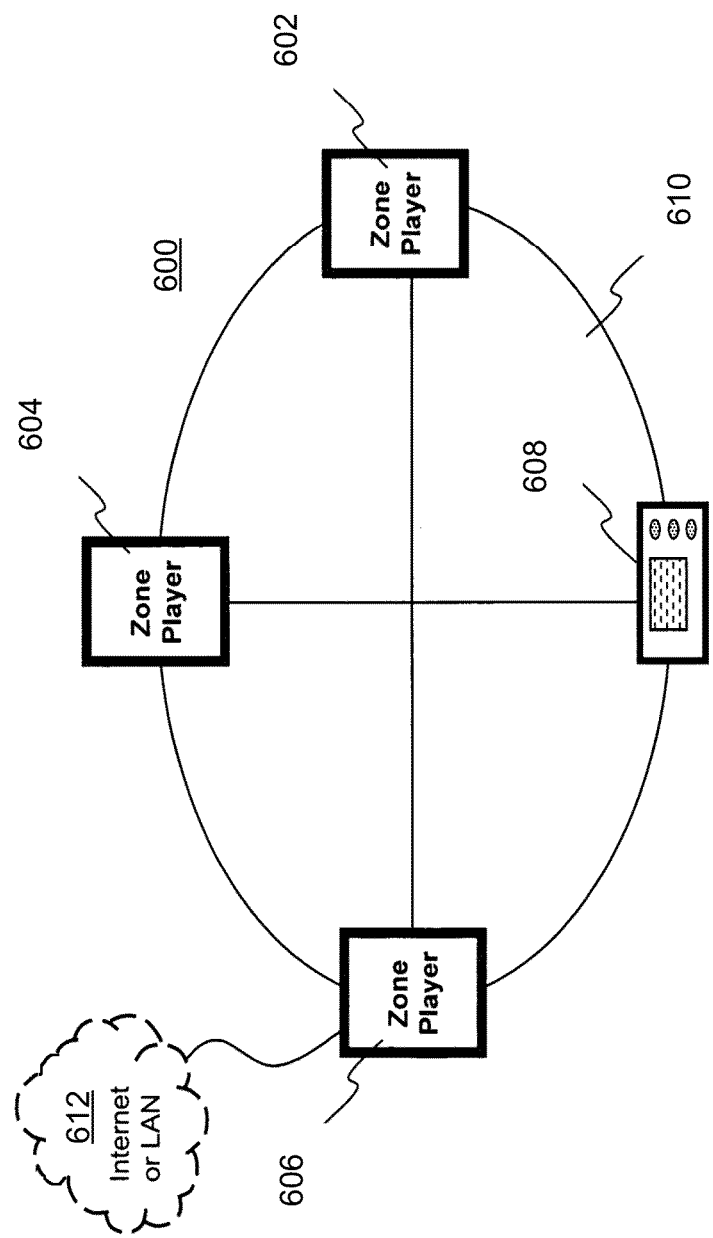
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may come/and go from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), SSID (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example System Configuration

Figure 7:
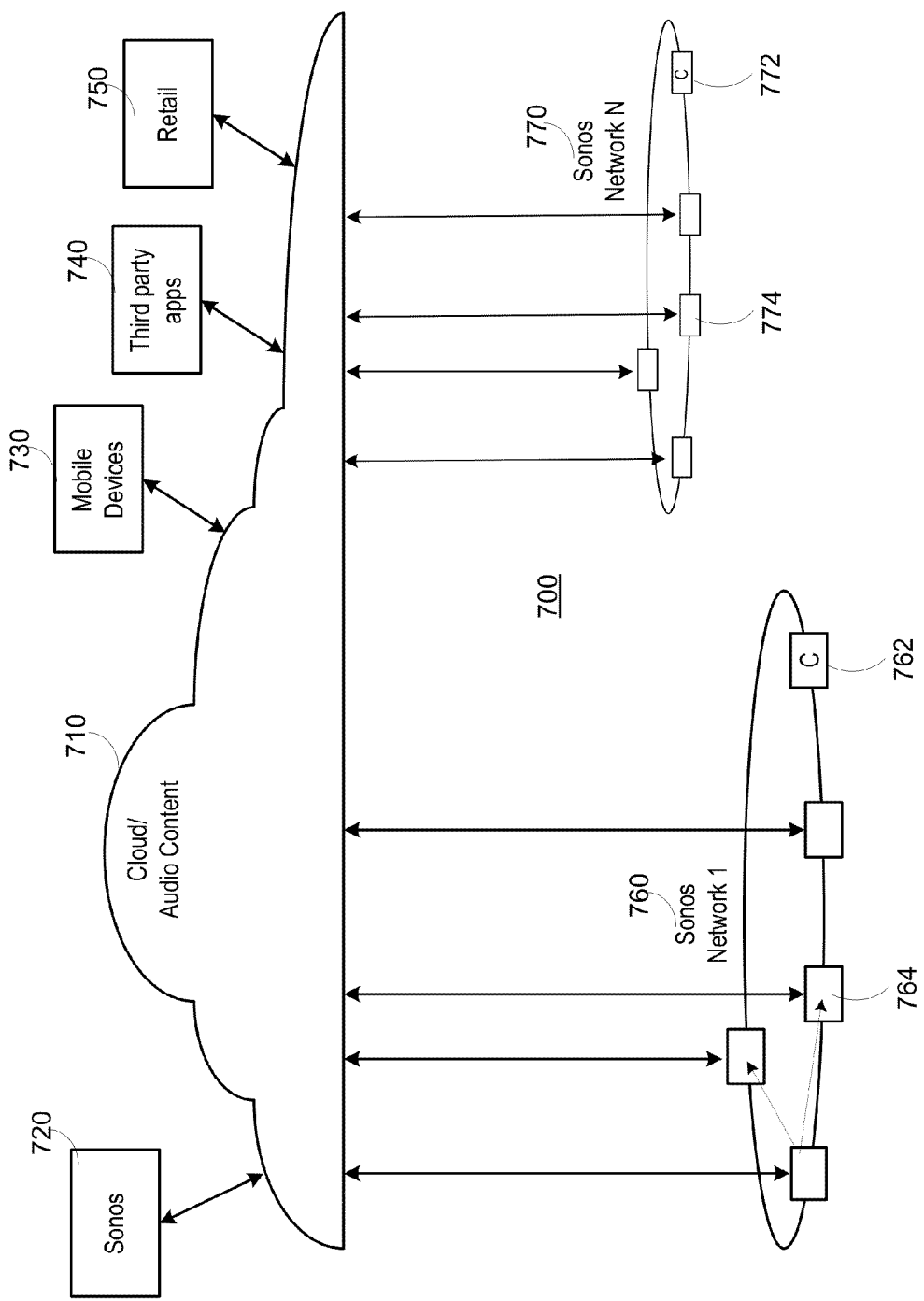
FIG. 7 shows a system including a plurality of networks including a cloud-based network and at least one local playback network.

FIG. 7 shows a system including a plurality of networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia playback system 720 (e.g., Sonos™), a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VII. Example Direct Routine-Enabled Zone Player

Certain particular examples will now be provided in connection with FIGS. 8-12 to describe, for purposes of illustration only, certain systems, apparatus and methods that override a governing protocol to provide and facilitate direct communication between nodes of a network audio system.

Figure 8:
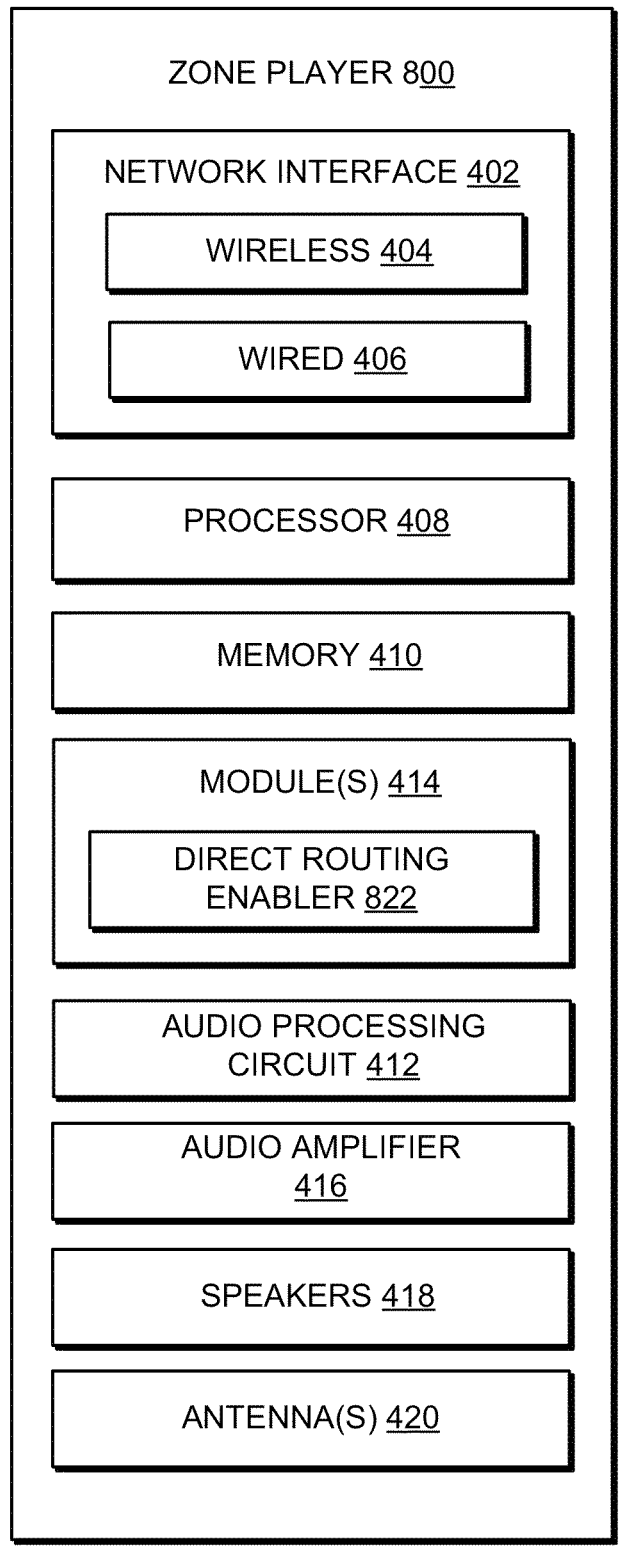
FIG. 8 shows an internal functional block diagram of an example zone player supporting direct routing.

FIG. 8 shows an internal functional block diagram of an example direct routing-enabled zone player 800 including direct spanning tree protocol control. The example zone player 800 of FIG. 8 may be used to implement any of the example zone players 102-124 of FIG. 1.

Like the example zone player 400 of FIG. 4, the example zone player 800 of FIG. 8 includes a network interface 402 (including wireless 404 and wired 406 interfaces), a processor 408, a memory 410, an audio processing component 412, a module 414, an audio amplifier 416, speakers 418, and one or more antenna(s) 420. These components are discussed in more detail above. More or less components may be included depending on the desired configuration.

The example zone player 800 of FIG. 8 further includes a direct routing enabler 822. The example direct routing enabler 822 of FIG. 8 enables the direct routing or linking of zone players and/or other nodes in a network. As described in detail below, the example direct routing enabler 822 evaluates a plurality of conditions to determine whether a direct link is to be utilized for particular frames and/or packets of data. That is, the example direct routing enabler 822 causes a node, in certain circumstances (e.g., presence of audio data, certain network configuration parameters, etc.), to override blocking imposed by a network configuration protocol. In such instances, the node bypasses an intermediary node (e.g., a root node, etc.) and communicates directly with a target node in contradiction with its bridge table settings. In some examples, the direct routing enabler 822 enables a direct link between nodes for only some type(s) of data, such as audio data, and not for other type(s) of data, such as Internet data.

VIII. Example Network Configuration

Figure 9:
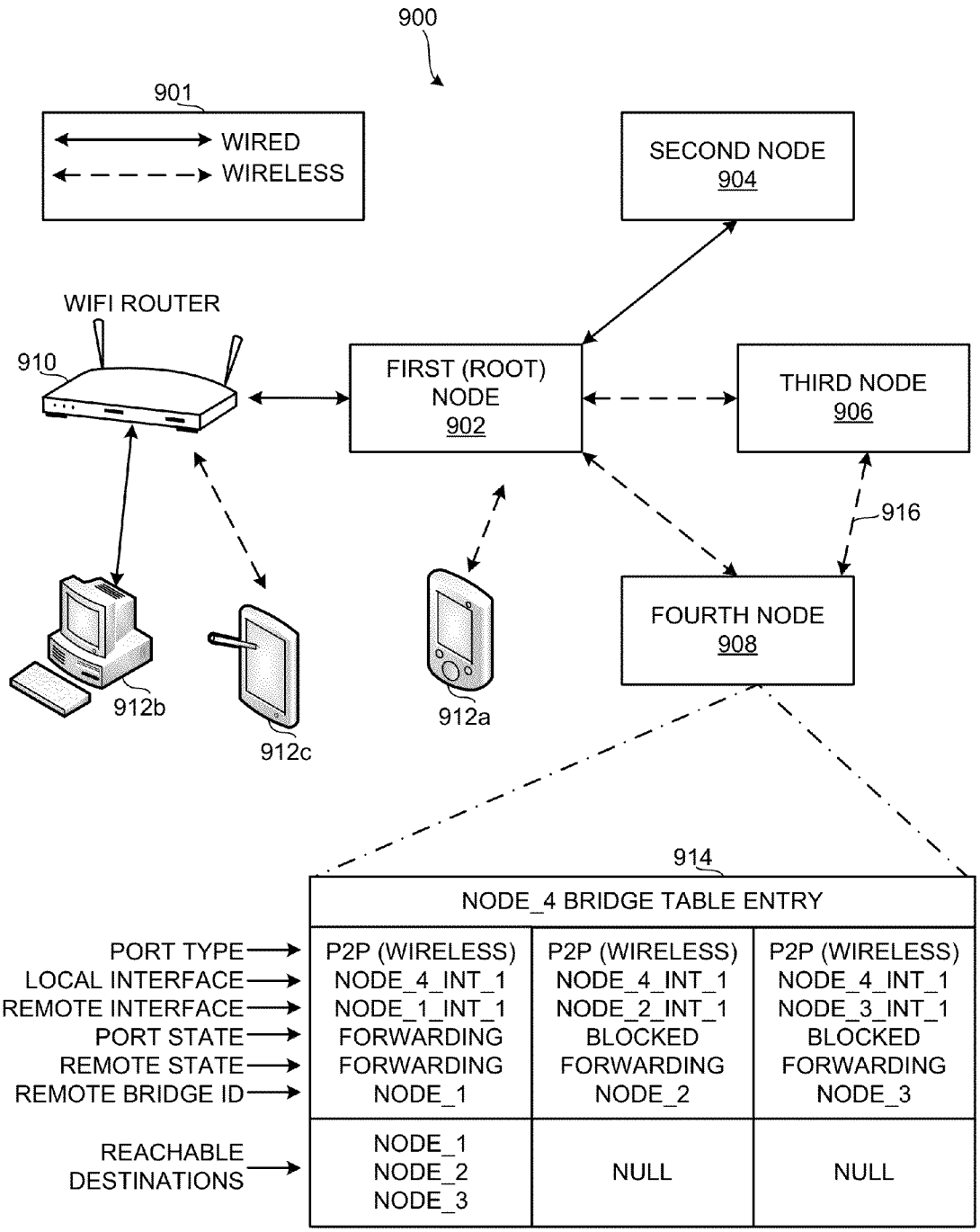
FIG. 9 shows an example network configuration.

FIG. 9 shows an example network 900 in which example methods and apparatus disclosed herein may be implemented. The example network 900 of FIG. 9 supports a combination of wired and wireless links and/or interfaces, as shown in the legend 901. The example network 900 includes four nodes 902, 904, 906 and 908 and a router 910. In the illustrated example, the nodes 902-908 correspond to media playback devices, such as the zone players of FIGS. 1, 2A-C, 4, and/or 8. For the purpose of discussion below, zone player (ZP) is used as a general term for all playback devices that can participate in a spanning tree. However, example methods and apparatus disclosed herein can be implemented in connection with any suitable type of device represented by the nodes 902-908 of FIG. 9. The example router 910 is a Wi-Fi router that supports both wired and wireless communication. However, additional or alternative type(s) of routers can be utilized to facilitate communication in the network 900. In the illustrated example, the first node 902 is in communication with the router 910 and the second node 904 via wired connections. Further, the first node 902 is in communication with the third node 906 and the fourth node 908 via wireless connections. As described in greater detail below, the nodes 902-908 are in communication with each other via one or more forwarding techniques and/or configurations.

The example nodes 902-908 are controlled using any one of a plurality of controllers 912a-c. A first one of the controllers 912a is implemented by a smart phone (e.g., an ANDROID® smart phone, an IPHONE®, etc.). A second one of the controllers 912b is a desktop computer (e.g., a PC or MAC®). A third one of the controllers 912c is a tablet device (e.g., an IPAD®). The example controllers 912a-c of FIG. 9 correspond to, for example, the example controller 130 of FIG. 1, controller 300 of FIG. 3 and/or example controller 500 of FIG. 5. The example controllers 912a-c of FIG. 9 implement an application configured to control the example nodes 902-908. The example controller 912a of FIG. 9 communicates with the nodes 902-908 via a direct communication with node 902. The example controllers 912b-c of FIG. 9 communicate with the nodes 902-908 via the example router 910.

Using the example network 900, the nodes 902-908 can share or exchange one or more audio sources and be grouped to play the same or different audio sources. Additionally or alternatively, audio sources can be placed in direct communication with the nodes 902-908. In some examples, the first node 902 and the second node 904 are grouped to playback one piece of music, and at the same time, the third node 906 plays back another piece of music. In other words, the nodes 902-908, as shown in FIG. 9, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service.

The example network 900 of FIG. 9 utilizes a mesh networking topology to place the nodes 902-908 in communication with each other. In addition to receiving and processing data (e.g., rendering received audio data), nodes of a meshed network are sometimes required to act as a bridge or relay to spread data to other nodes. Such a network configuration increases the reachability of the individual nodes 902-908. The example mesh network 900 of FIG. 9 is configured according to a spanning tree protocol (STP). The spanning tree protocol is utilized by the example network 900 to implement a topology that does not include loops.

In certain examples, the mesh network 900 is based on IEEE 802.1d spanning tree protocol (STP) (with or without some proprietary enhancements). The example mesh network 900 supports meshing over both wired (e.g., wired interface 406) and wireless (e.g., wireless interface 404) interfaces. For a wireless interface (e.g., at 2.4 GHz), rather than classifying the interface itself as a bridge port (e.g., as it would be according to IEEE 802.1d), each peer zone player that is reachable through the interface is added as a port in the bridge (e.g., in the bridge table). Zone players (ZP) classify these ports as point-to-point (p2p) and, among other things maintained for a p2p port entry, maintain an interface Media Access Control (MAC) address of a corresponding peer ZP. Traffic flowing through these ports is encapsulated in a p2p header and is forwarded as unicast frames, for example.

For example, in FIG. 9 where the first node 902 is wired to both the second node 904 and the Wi-Fi router 910, the first node 902 includes five port entries in its bridge table: two entries for its wired interface and three entries for its wireless neighbors (e.g., second node 904 (which also includes a wireless interface), third node 906, and fourth node 908). Port entries for the second node 904, third node 906, and fourth node 908 identify the nodes as p2p ports and maintain information about an interface MAC address for each node (e.g., used for encapsulation). For example, if the first node 902 is to forward a frame towards the third node 908, the first node 902 first encapsulates the frame in p2p a header with a recipient address of the header set to the wireless interface MAC address of the fourth node 908.

In certain examples, using STP as a forwarding algorithm can result in triangular routing. Triangular routing occurs if a device (e.g., a zone player or other playback device) has a direct link to a neighbor but STP has blocked the direct link to prevent routing loops. For example, in the network 900 of FIG. 9, four nodes (e.g., zone players) are within communication range of each other. The first node 902 works as the root of the spanning tree and has direct links to the second node 904, third node 906, and fourth node 908. To prevent routing loops, the spanning tree protocol blocks the fourth node's 908 p2p port to the second node 904 and the third node 906, and the third node's 906 p2p port to the second node 904. If the third node 906 has a frame destined for the fourth node 908, the third node 906 has to send the frame to the fourth node 908 through the first node 902, which results in triangular routing.

In certain examples, to prevent, reduce or minimize a possibility of triangular routing in the mesh network 900, "direct routing" is described and used herein for route optimization or improvement. In direct routing, if a zone player has a unicast frame whose final destination is its neighbor and the neighbor itself is not next-hop in a spanning tree, then, rather than using the spanning tree to forward the frame, the frame can be directly sent using a unicast methodology to the neighbor. If the frame is forwarded to a multicast group, the zone player also checks to see if remaining members of the multicast group are its neighbors. If members of the group are its neighbors, then the zone player unicasts the frame to individual members of the multicast group rather than using the spanning tree, for example.

In certain examples, a determination of whether a zone player is a neighbor includes not only a network distance but also a signal strength. For example, neighbors are to have sufficient wireless signal strength for data communication between the neighbors.

In certain examples, rather than employing a strictly next-hop approach, a "least-hops" or "less-hops" approach can be employed. For example, if direct routing between zone players takes two hops but following the STP takes three hops, then direct routing to take two hops is employed. In certain examples, direct routing may be employed for certain types of data, rather than all data being routed. For example, audio data may be eligible for direct routing while other data may follow the STP.

The spanning tree protocol implements bridge tables at each of the zone players 902-908 that define manners in which the respective zone player communicates with other zone players of the network 900. The bridge tables of the STP can be stored locally on the zone players 902-908 and are updated when, for example, a zone player is added to the network 900, deleted from the network 900, and/or the network 900 is otherwise modified. In some examples, the network 900 automatically configures and/or reconfigures itself without input from a user. In such instances, the spanning tree protocol maintains a configuration that prevents data communication from looping. To prevent loops in the communication of data between the zone players 902-908, the bridge tables generated in accordance with the spanning tree protocol include entries or settings that block direct communication between two zone players. That is, the loop-preventing aspects of the spanning tree protocol sometimes force a communication path between two nodes to be bridged by an intermediary node. The two nodes for which direct routing communication is prohibited by the spanning tree protocol are referred to herein as "blocked" nodes.

FIG. 9 includes an example bridge table entry 914 of the fourth node 908 of the example network 900. While the example bridge table entry 914 of the fourth node 908 is shown in FIG. 9, each of the other nodes 902-906 includes a similar (but differently configured) bridge table entry. In addition to the information shown in FIG. 9, the bridge tables of the nodes 902-908 may contain other information for routing and/or other purposes. Further, although shown as a single table 914 in the example of FIG. 9, the information of the example table 914 can be implemented in one or more tables (e.g., a bridge table and a forwarding table). The example bridge table entry 914 defines communication paths between the fourth node 908 and the other nodes 902-906 of the network 900. As the example nodes 902-908 of FIG. 9 correspond to zone players, the nodes 902-908 include communication ports that are each capable of establishing a link with another node. The link at each port can be wired or wireless in the example of FIG. 9. The example bridge table entry 914 maintains characteristics of the ports of the fourth node 908, thereby controlling the manner in which the fourth node 908 communicates data to and from the respective other nodes 902-906.

In the illustrated example, the bridge table 914 includes, for each interface of the fourth node 908, a port type, a local interface address, a remote interface address (e.g., remote MAC address), a port state, a remote port state, an identification of the remote node (e.g., remote Bridge ID), and a list of reachable nodes (e.g., a list of Bridge IDs) through the interface. The port type indicates whether the corresponding link is a wired link or a wireless link. In the example of FIG. 9, when the port type is a point-to-point (p2p) port, the corresponding communication link is a wireless link. Thus, the example bridge table entry 914 of FIG. 9 indicates that the fourth node is in or can be in wireless communication with each of the other nodes 902-906. Conversely, the bridge table entry of the second node (not shown) includes at least one port entry corresponding to the first node 902 that indicates a wired communication link.

The remote interface address (e.g., REMOTE INTERFACE) of the example bridge table entry 914 identifies the corresponding node by a destination address (e.g., a MAC address) of the corresponding node. The example bridge table entry 914 shows the remote interface address for each port with a name of the corresponding port. However, the name may be representative of a numerical network address. The remote interface information is used to direct a frame of data to the proper one of the interfaces of the proper one of the nodes 902-908. For example, when the fourth node 908 needs to forward data to the third node 906, the device represented by the fourth node 908 encapsulates the frame in a p2p header having a destination address set to the wireless remote interface address of the third node 906. As a result, as the frame of data traverses the network 900, the nodes that are forwarding the frame are aware of the destination of the frame.

The port state and the remote state information of the example bridge table entry 914 control whether or not the fourth node 908 can directly communication with the corresponding port. As mentioned above, the spanning tree protocol is implemented to prevent data from traversing a loop in the network 900. To do so, the spanning tree protocol blocks certain nodes from forwarding data directly to certain other nodes. For example, the bridge table 914 of FIG. 9 indicates that the fourth node is blocked from forwarding data directly to the second node 904. The fourth node 908 is also blocked from forwarding data directly to the third node 906. Further, the fourth node 908 is able to forward data directly to the first node 902 which, in the example of FIG. 9, is the root node of the network 900. Thus, if the fourth node 908 needs to transmit data to the third node 906, the data is routed from the fourth node 908 to the first node 902, and from the first node 902 to the third node 906. Similarly, if the fourth node 908 needs to transmit data to the second node 904, the data routed from the fourth node 908 to the first node 902, and from the first node 902 to the second node 904.

While such a configuration is useful for preventing looping of data and the drawbacks thereof, the blocking of the links enforced by the spanning tree protocol also results in longer communication paths for data. For example, the requirement of the fourth node 908 to route data to the third node 906 through the first node 902 can be considered triangular routing. The triangular route between the fourth node 908 and the third node 906 is longer than a direct route or link between the fourth node 908 and the third node 906. Such a direct route is shown in the example of FIG. 9 as a direct wireless link 916. The example direct routing enabler 822 of FIG. 8 enables the direct route or link 916 of FIG. 9. As described in detail below, the example direct routing enabler 822 evaluates a plurality of conditions to determine whether the direct link 916 (and/or other direct links in the network 900) is to be utilized for particular frames and/or packets of data. That is, the example direct routing enabler 822 causes the fourth node 908, in certain circumstances, to override the blocking imposed by the network configuration protocol of the network 900. In such instances, the fourth node 908 bypasses the first node 902 and communicates directly with the third node 906 in contradiction with the settings of the bridge table entry 914. In some examples, the enablement of the direct link 916 is configured for some type(s) of data, such as audio data, and not for some type(s) of data, such as Internet data.

IX. Example Direct Communication

Figure 10:
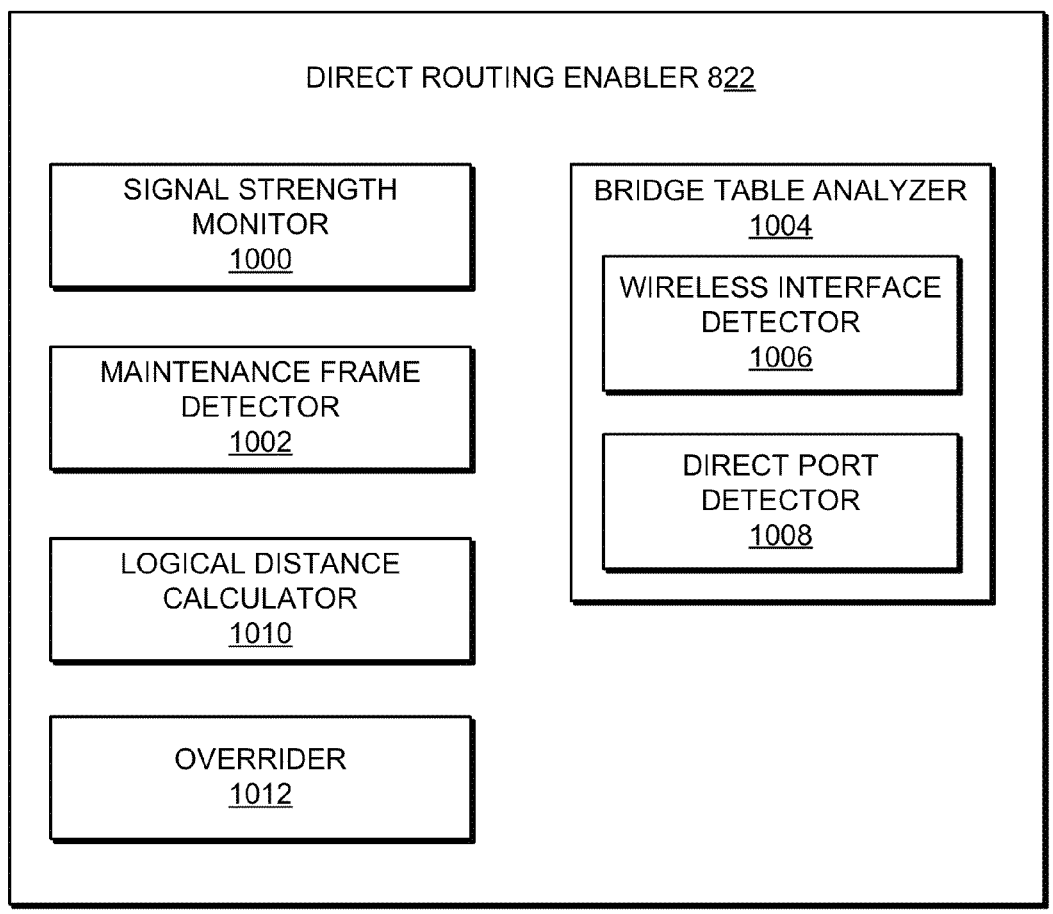
FIG. 10 shows an internal functional block diagram of the example direct routing enabler of FIG. 8.

FIG. 10 is an example implementation of the direct routing enabler 822 of FIG. 8. For purposes of illustration, the example direct routing enabler 822 of FIG. 10 is described below as implemented at the example fourth node 908 of FIG. 9. However, the example direct routing enabler 822 of FIGS. 8 and/or 10 can be implemented in any of the nodes 902-908 of FIG. 9 and/or other node(s) of alternative network(s). The example direct routing enabler 822 enables the example direct link 916 of FIG. 9 and/or any other direct link(s) between the nodes 902-908 of FIG. 9.

The example direct routing enabler 822 of FIG. 10 includes a signal strength monitor 1000 to detect and/or evaluate quality and/or reliability of wireless communication links between the nodes 902-908. In the illustrated example, the nodes 902-908 undergo a learning phase when introduced into the network 900. When the example signal strength monitor 1000 initially detects one of the other nodes 902-906, the example signal strength monitor 1000 causes an entry to be added and populated in the bridge table entry 914. A program or application implementing the spanning tree protocol is executed to generate the settings to populate the new entry of the bridge table of the network 900. That is, the spanning tree protocol determines whether, for example, the detected node can communicate directly with the fourth node 908. After the network configuration protocol information has been populated in the table 914, the example signal strength monitor 1000 determines whether the wireless links of the table 914 have a strength (e.g., via remote signal strength indication (RSSI) monitoring) indicative of a high quality link. In other words, the example signal strength monitor 1000 tests the wireless link(s) between fourth node 908 and the other nodes 902-906 to determine whether the wireless link(s) can be trusted for direct communication (e.g., routing audio data).

For each of the wireless ports of the table 914, the example signal strength monitor 1000 enables direct communication (e.g., for the direct link 916 of FIG. 9) if the corresponding signal strength between the respective nodes is above a threshold. The threshold may be, for example, twenty-five decibels (dB). The enablement of direct communication for a certain port (e.g., the wireless interface port of the third node 906) is recorded via, for example, a flag in the corresponding entry of the bridge table 914 and/or any other data structure associated with the fourth node 908 and/or the network 900. Further, the example signal strength monitor 1000 continues to monitor the signal strength of the wireless links. If the strength of a wireless link that has been enabled for direct communication drops below the threshold, the example signal strength monitor 1000 of FIG. 10 disables the corresponding direct communication (e.g., by toggled the corresponding flag of the table 914). Thus, enablement of, for example, the direct link 916 of FIG. 9 can fluctuate depending on the signal strength of the wireless link between the fourth node 908 and the third node 906. In certain examples, the threshold to maintain a direct communication link may differ from the threshold to add a direct communication link (e.g., 19 dB to maintain a direct communication link and 25 dB to add a direct communication link, and so on).

The example direct routing enabler 822 includes a maintenance frame detector 1002 to determine whether a frame of data corresponding to network maintenance information. As described above, network configuration settings associated with, for example, the network 900 of FIG. 9 is updated on an on-going basis. To help ensure that network configuration information is properly updated throughout the network 900, one or more of the nodes 902-908 periodically transmits maintenance frame(s). The periodicity of the maintenance frame(s) can be based on, for example, a maximum age value (e.g., which is a timer that controls the maximum length of time that passes before a bridge port saves configuration information) of a corresponding STP node. The maintenance frame(s) are to be routed through the network 900 according to the network protocol settings (e.g., the spanning tree protocol settings) regardless of an enabled direct communication link. For example, when the fourth node 908 receives a maintenance frame, the fourth node 908 routes the frame to the third node 906 (if the frame is directed to the third node 906) according to the "blocked" setting of the table 914. In other words, despite the enablement of the direct link 916 of FIG. 9, the fourth node 908 directs frames identified by the detector 1002 as maintenance frames to the third node 906 via the first node 902. This ensures that the first node 902 is exposed to any network configuration updates intended for the first node 902 when the first node 902 may have otherwise been bypassed by the direct routing enabler 822.

Additional or alternative techniques can be utilized to ensure that network configuration information is properly updated throughout the network 900. For example, the direct routing enabler 822 can disable the direct route provided thereby for a number of frames (e.g., one frame out of every one hundred frames). When the direct route is disabled, the frames are sent through the STP communication path. In such instances, if data arrives at one or more devices out of order, the data can be reassembled. Additionally or alternatively, the example direct routing enabler 822 and/or any other suitable component of the example zone player 800 can periodically send a duplicate frame through the STP communication path. In such instances, the duplicate frame can be discarded.

To determine whether received data (e.g., a packet of data, a frame of data, a group of packets, etc.) is to be directly communicated to a destination node despite a network protocol setting indicating that the data is to be indirectly communicated (e.g., via an intermediary node), the example direct routing enabler 822 includes a bridge table analyzer 1004 having a wireless interface detector 706 and a direct port detector 1008, a logical distance calculator 1010, and an overrider 1012. As the example direct routing enabler 822 receives frame(s) of data, the example bridge table analyzer 1004 of FIG. 10 analyzes the table of the corresponding node of the network with respect to the received frame(s). In the illustrated example, when the fourth node 908 receives a data frame, the example bridge table analyzer 1004 analyzes the example table 914 of FIG. 9. In particular, the example bridge table analyzer 1004 determines what type of port the fourth node 908 is set to use for forwarding the received frame and whether or not a destination node of the frame is available to the fourth node 908 via a direct port (e.g., is a neighbor of the fourth node).

To determine what type of port the fourth node 908 is to use to forward the frame, the example wireless interface detector 1006 determines whether the appropriate forwarding port corresponds to a wired interface or a wireless interface. As the forwarding ports of the fourth node 908 are each a wireless interface, the wireless interface detector 1006 determines that the appropriate forwarding port for the example received frame is a wireless port. However, another instance of the wireless interface detector 1006, such as one associated with the second node 904 of FIG. 9, may determine that the appropriate forwarding port is a wired interface. In the example of FIG. 10, for the direct routing enabler 822 enables the direct communication disclosed herein (e.g., the direct link 916 of FIG. 9) when the appropriate forwarding port is determined to be a wireless link or interface. Further, the direct routing enabler 822 does not enable the direct communication disclosed herein when the appropriate forwarding port is determined to be a wired link or interface. To implement this configuration, the example wireless interface detector 1006 generates an indication of its findings for the frames of data received at the direct routing enabler 822, which is used by the direct routing enabler 822 to activate and/or deactivate the direct links used to override a governing network protocol that is otherwise blocking the direct links.

The example direct port detector 1008 extracts a destination address of the received frame of data (e.g., a from a frame header) to determine whether the destination node is directly accessible by the fourth node 908. That is, the example direct port detector 1008 determines whether the receiving node has a direct link with the node at which the received frame is destined to be transmitted. In the illustrated example, the direct port detector 1008 compares the destination address of the received frame to the remote Bridge ID of the bridge table entry 914. As described above, the bridge table entry 914 of the fourth node 908 includes a p2p entry for each node wirelessly sensed by the fourth node (e.g., via the signal strength monitor 1000). Therefore, in the illustrated example, if the bridge table entry 914 includes an entry having a remote Bridge ID matching the destination address of the received frame, the direct port detector 708 determines that the fourth node 908 includes a direct link with the destination node of the received frame. In the example of FIG. 10, the direct routing enabler 822 enables the direct communication disclosed herein (e.g., the direct link 916 of FIG. 9) for frames of data when the node receiving the frames is in direct communication with the destination node of the frames. Further, the example direct routing enabler 822 of FIG. 10 does not enable the direct communication disclosed herein for frames of data when the node receiving the frames lacks a direct communication interface with the destination node of the frames. Therefore, the example direct port detector 1008 generates an indication of its findings for the frames of data received at the direct routing enabler 822, which is used by the direct routing enabler 822 to activate and/or deactivate the direct links used to override a governing network protocol that is otherwise blocking the direct links.

Accordingly, for a frame of data received at the fourth node 908, the example bridge table analyzer 1004 generates a first indication that the fourth node 908 uses (or does not use) a wireless interface (e.g., logical port) to forward the received frame, and a second indication that the fourth node 908 has (or does not have) a direct link with a destination node of the received frame.

The logical distance calculator 1010 of the example direct routing enabler 822 of FIG. 10 determines whether received frames of data are "next-hop" frames. As used herein, a "next-hop" frame of data is one that is configured to arrive at its final destination node upon its next hop according to a governing network protocol that defines a communication path for the frame of data. In other words, if a network protocol (e.g., as defined by bridge tables in an STP network) indicates that the frame is set to not be forwarded by the next node in the corresponding communication path, the frame is designated as a "next-hop" frame. For example, the spanning tree protocol governing the example network 900 of FIG. 9 defines a communication path through the first node 902 for a frame of data at the fourth node 908 destined for (e.g., have a destination address of) the second node 904. Such a frame is not a "next-hop" frame while at the fourth node 908. However, the frame is a "next-hop" frame while at the first node 902 because the subsequent node in the STP communication path is the destination node (the second node 904).

To determine whether a received frame of data is a "next-hop" frame, the example logical distance calculator 1010 analyzes the destination for the received frame to determine if there is a remote Bridge ID entry matching that destination in the bridge table. If the destination address of the frame is the next node in the communication path, the logical distance calculator 1010 determines that the logical distance for the frame is one hop. On the other hand, if the destination address of the frame is not the next node in the communication path, the logical distance calculator 1010 determines that the logical distance for the frame is greater than one hop. In some examples, the logical distance calculator 1010 determines whether the logical distance is or is not greater than one hop. That is, the example logical distance calculator 1010 determines whether or not the logical distance of the frame to the destination node is greater than a threshold (e.g., one hop). Alternatively, the example logical distance calculator 1010 can determine and/or record the number of hops.

When the example logical distance calculator 1010 determines that the frame is a "next-hop" frame, the example direct routing enabler 822 does not enable the direct link disclosed herein because the governing network protocol that would be overridden by the direct link already accomplishes the communication of the direct link. That is, enablement of the direct link (e.g., the link 916 of FIG. 9) would not bypass any intermediary node when the frame is a "next-hop" frame. Therefore, in such instances, the direct routing enabler 822 allows the governing protocol communication path to be followed. On the other hand, when the frame is not a "next-hop" frame, the example direct routing enabler 822 does enable the direct link disclosed herein. Thus, the example logical distance calculator 1010 generates an indication of its findings for use by the direct routing enabler 822 in activating and/or deactivating the appropriate direct link(s).

While the above example is illustrated with respect to a "next-hop" frame, the direct routing enabler 822 can enable direct routing between nodes in a communication path where a direct routing approach is faster than a spanning tree approach (e.g., direct routing is a two-hop path while the STP provides a three-hop path). Alternatively or in addition, the direct routing enabler 822 can determine whether STP-only, direct routing for next-hop nodes, direct routing for shorter hop nodes, direct routing for certain types of data (e.g., audio), etc., is employed.

The example overrider 1012 of FIG. 10 receives information from the signal strength monitor 1000, the maintenance frame detector 1002, the bridge table analyzer 1004, and the logical distance calculator 1010 indicative of whether direct communication that contradicts the governing network protocol settings should be used in connection with a corresponding frame or frames of data. If the indications and/or detections described above in connection with the signal strength monitor 1000, the maintenance frame detector 1002, the bridge table analyzer 1004, and the logical distance calculator 1010 indicate that the direct communication should bypass the communication path defined in the governing network protocol (e.g., the bridge table entries 914), the example overrider 1012 replaces a destination port of the frame(s) with the destination address of the frame(s). That is, when a received frame at the fourth node 908 is configured by the spanning tree protocol tables to be routed to the third node 906 via the first node 902, the frame is encapsulated in a p2p header having a destination address set to the wireless remote interface address corresponding to the first node 902 and a destination address in the original frame still corresponding to the third node 906. The example overrider 1012 (when authorized to do so by the other components of the direct routing enabler 822) replaces the destination address in the encapsulated p2p header corresponding to the intermediary node (e.g., the first node 902) with the destination address set to the wireless remote interface address of the final node (e.g., the third node 906). Further, the example overrider 1012 designates the frame as a special type of frame referred to herein as an "ether frame." An "ether frame" is one that the overrider 1012 has manipulated to override or bypass the communication path defined by the spanning tree protocol tables. In some examples, the special type of frame designation prevents the destination node from updated the governing network protocol settings (e.g., table entries) based on frames that are received via the direct routing override disclosed herein. Further, the example overrider 1012 does not alter the network protocol settings that define the spanning tree protocol communication path involving the fourth node 908. Instead, the frames of data are directly routed to the destination node without changing the settings of the governing network protocol.

Although the above description refers to unicast frames, which have a single destination address, the frames received at the nodes 902-908 can alternatively be multicast frames, which have a multi-cast group ID used for more than one destination address. For multicast frames, the example direct routing enabler 822 evaluates each of the destination addresses of the multicast group to determine whether a direct link should be used to communicate the data to respective nodes of the multicast frame. In some examples, the direct routing enabler 822 can enable a direct link for a first node of the multicast frame and not a second node of the multicast frame. Alternatively, the direct routing enabler 822 may require each of the destination nodes to qualify for a direct link.

While an example manner of implementing the direct routing enabler 822 of FIG. 8 has been illustrated in FIG. 10, one or more of the elements, processes and/or devices illustrated in FIG. 10 may be combined, divided, re-arranged, omitted, eliminated and/or implemented in any other way. Further, the example signal strength monitor 1000, the example maintenance frame detector 1002, the example bridge table analyzer 1004, the example wireless interface detector 1006, the example direct port detector 1008, the example logical distance calculator 1010, the example overrider 1012, and/or, more generally, the example direct routing enabler 822 of FIG. 10 may be implemented by hardware, software, firmware and/or any combination of hardware, software and/or firmware. Thus, for example, any of the example signal strength monitor 1000, the example maintenance frame detector 1002, the example bridge table analyzer 1004, the example wireless interface detector 1006, the example direct port detector 1008, the example logical distance calculator 1010, the example overrider 1012, and/or, more generally, the example direct routing enabler 822 of FIG. 10 could be implemented by one or more circuit(s), programmable processor(s), application specific integrated circuit(s) (ASIC(s)), programmable logic device(s) (PLD(s)) and/or field programmable logic device(s) (FPLD(s)), field programmable gate array (FPGA), etc. When any of the appended claims are read to cover a purely software and/or firmware implementation, at least one of the example signal strength monitor 1000, the example maintenance frame detector 1002, the example bridge table analyzer 1004, the example wireless interface detector 1006, the example direct port detector 1008, the example logical distance calculator 1010, the example overrider 1012, and/or, more generally, the example direct routing enabler 822 of FIG. 10 are hereby expressly defined to include a tangible computer readable medium such as computer readable storage medium (e.g., a memory, DVD, CD, Blu-ray, etc. storing the software and/or firmware). Further still, the example direct routing enabler 822 of FIG. 10 may include one or more elements, processes and/or devices in addition to, or instead of, those illustrated in FIG. 10, and/or may include more than one of any or all of the illustrated elements, processes and devices.

Figure 11:
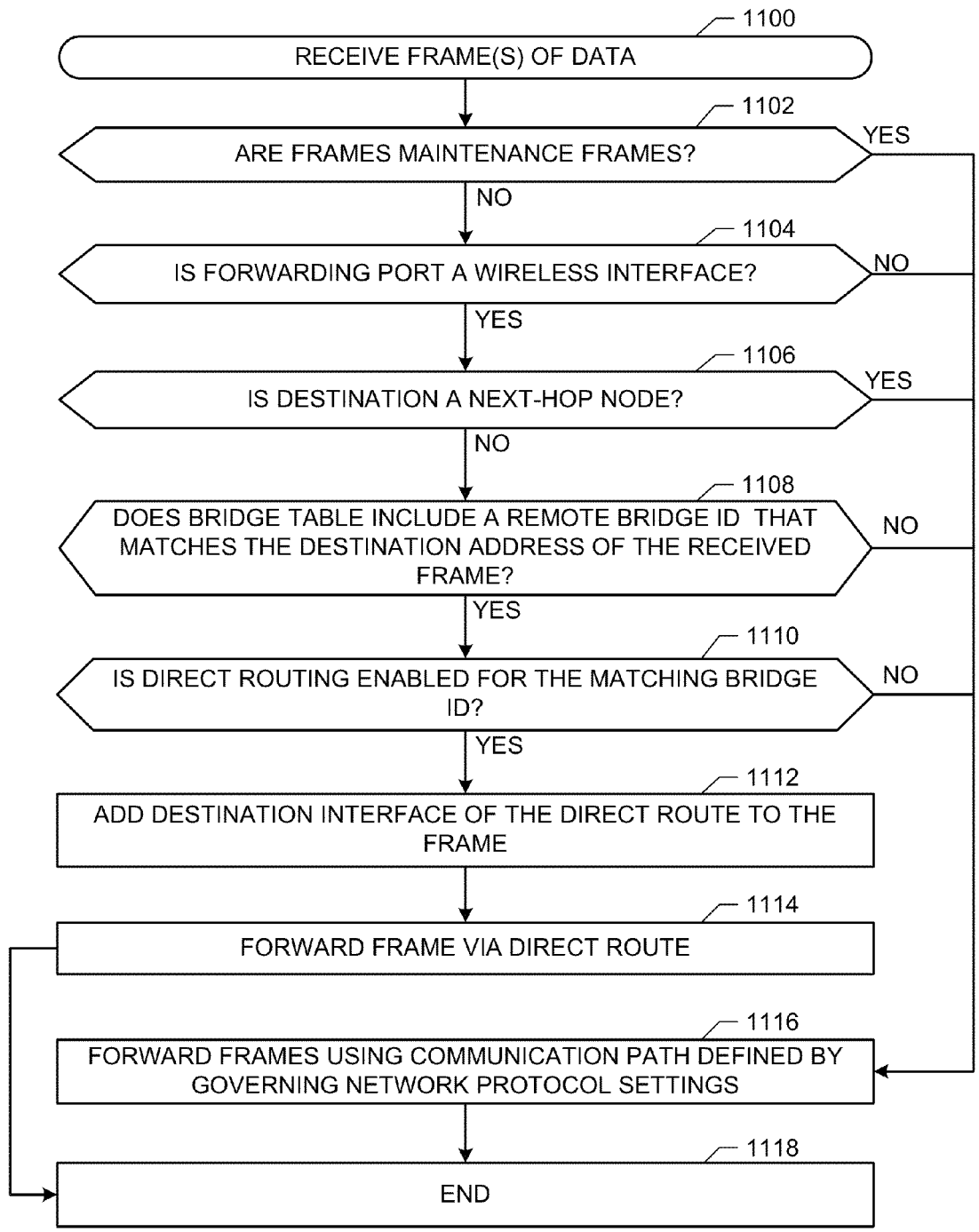
FIGS. 11 and 12 show flowcharts for example methods or processes for the example direct communication enabler of FIGS. 8 and/or 10.
Figure 12:
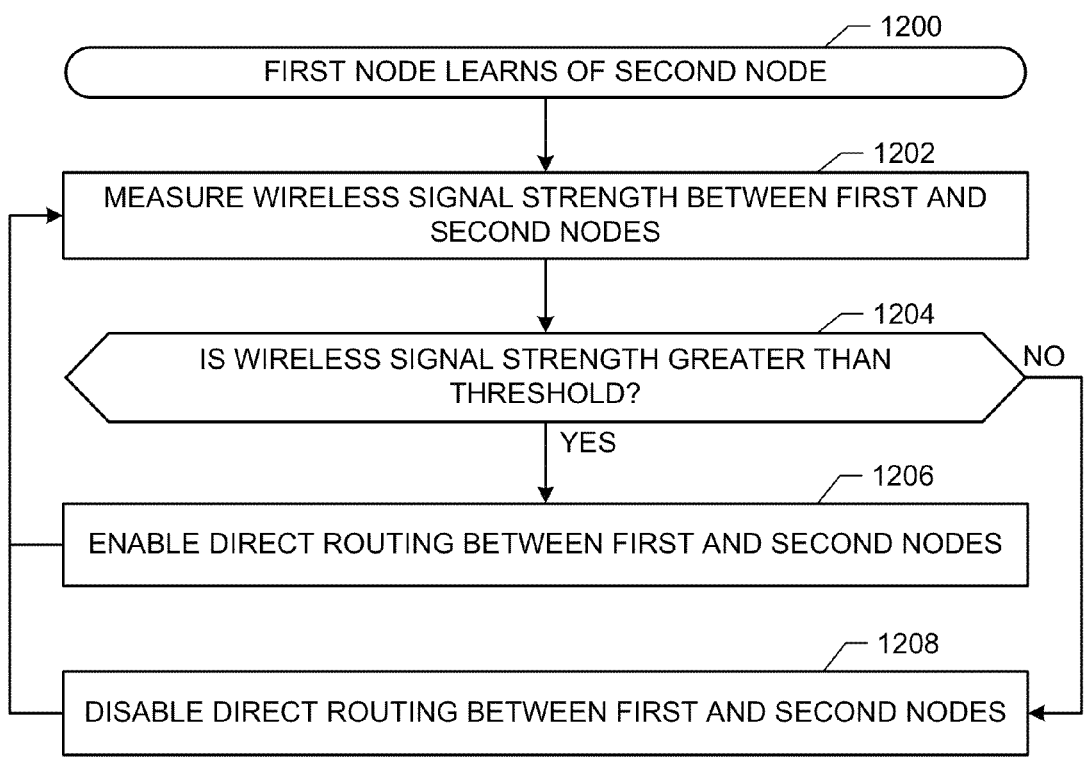

Flowcharts representative of example machine readable instructions for implementing and/or to be implemented with the example direct routing enabler 822 of FIGS. 8 and/or 10 are shown in FIGS. 11 and 12. In the examples of FIGS. 11 and 12, the machine readable instructions comprise a program for execution by a processor such as the processor 408 of FIG. 4. The program may be embodied in software stored on a tangible computer readable medium such as a CD-ROM, a floppy disk, a hard drive, a digital versatile disk (DVD), a Blu-ray disk, or a memory associated with the processor 408, but the entire program and/or parts thereof could alternatively be executed by a device other than the processor 408 and/or embodied in firmware or dedicated hardware. Further, although the example programs are described with reference to the flowcharts illustrated in FIGS. 11 and 12, many other methods of implementing the example direct routing enabler 822 may alternatively be used. For example, the order of execution of the blocks may be changed, and/or some of the blocks described may be changed, eliminated, or combined.

FIG. 11 begins with receipt of one or more frames of data, such as audio data, at one of the nodes 902-908 of FIG. 9 (block 1100). The received frame(s) can be data packets, a single frame of data, a group of data packets, etc. For purposes of illustration, FIG. 11 is discussed with reference to the frame(s) of data being received at the fourth node 908 of FIG. 9. The example maintenance frame detector 1002 (FIG. 10) determines whether the received frame(s) are maintenance frame(s) sent over the network 900 (FIG. 9) to maintain network configuration settings (block 1102). If the maintenance frame detector 1002 determines that the received frame(s) include a maintenance frame, the maintenance frame detector 1002 generates an indication that the governing network protocol is to be used to forward the frame(s) and control proceeds to block 1116. Otherwise, if the maintenance frame detector 1002 determines that the received frame(s) do not include a maintenance frame, a corresponding indication is generated and control proceeds to block 1104.

The example wireless interface detector 1006 (FIG. 10) determines whether the forwarding port to be used by the fourth node 908 to forward the received frame(s) is a wireless interface (block 1104). To do so, the example wireless interface detector 1006 analyzes the bridge table entry 614 (FIG. 6) to determine whether the fourth node 608 forwards the received frame(s) via, for example, a p2p port, which is indicative of a wireless interface being utilized. If the wireless interface detector 1006 determines that the forwarding port of the fourth node 908 is a wired interface, the wireless interface detector 1006 generates an indication that the governing network protocol is to be used to forward the frame(s) and control proceeds to block 1116. Otherwise, if the wireless interface detector 1006 determines that the forwarding port of the fourth node 908 is a wireless interface, a corresponding indication is generated and control proceeds to block 1106.

The example logical distance calculator 1010 (FIG. 10) determines whether the received frame(s) are "next-hop" frame(s) (block 1106). To do so, the example logical distance calculator 1010 calculates a number hops remaining in a communication path defined by the governing network protocol settings. If the logical distance calculator 1010 determines that the received frame(s) are "next-hop" frame(s), the logical distance calculator 1010 generates an indication that the governing network protocol is to be used to forward the frame(s) and control proceeds to block 1116. Otherwise, if the logical distance calculator 1010 determines that the received frame(s) are not "next-hop" frame(s), a corresponding indication is generated and control proceeds to block 1108.

While the above example is illustrated with respect to a "next-hop" frame, the logical distance calculator 1010 can determine whether a number of hops to deliver a frame via direct routing is less than a number of hops to deliver the frame via the spanning tree protocol (e.g., direct routing is a two-hop path while the STP provides a three-hop path). If the number of hops via direct routing is less than the number of hops via STP, then direct routing proceeds as with the next-hop approach, for example.

The example direct port detector 1008 (FIG. 10) determines whether the bridge table entry 914 of the fourth node 908 includes a port with a bridge identifier (e.g., in the remote interface field) that matches the destination address of the received frame(s) (block 1108). In other words, the example direct port detector 1008 determines whether the destination node of the received frame(s) are neighbor(s) (e.g., accessible via a direct wireless communication without use of an intermediary node) of the fourth node 908. If the direct port detector 1008 determines that the table 914 does not include a matching port, the direct port detector 1008 generates an indication that the governing network protocol is to be used to forward the frame(s) and control proceeds to block 1116. Otherwise, if the direct port detector 1008 determines that the table 914 includes a matching port (e.g., that the fourth node 908 and the destination node are neighbors), a corresponding indication is generated and control proceeds to block 1110.

An output of the example signal strength monitor 1000 (FIG. 10) is checked to determine whether the direct link for bypassing the governing network protocol is enabled based on the signal strength of the wireless link between the fourth node 908 and the destination node of the received frame(s) (block 1110). FIG. 12 illustrates an example implementation of block 1110 of FIG. 11. The example of FIG. 12 begins when the signal strength monitor 1000 and/or another learning component of a first node (e.g., the fourth node 908) learns of a second node in the network 900 (e.g., the third node 906) via wireless communication (e.g., by receiving RSSI data) (block 1200). The example signal strength monitor measures the corresponding signal strength between the first node and the second node by, for example, calculating an average number of valid RSSI messages exchanged between the first and second nodes over a period of time (block 1202). If the measuring signal strength is greater than a threshold (e.g., twenty-five dB) (block 1204), the signal strength monitor 1000 enables direct communication between the first and second nodes (block 1206). Otherwise, the signal strength monitor 1000 disables direct routing between the first and second nodes (block 1208). The example signal strength monitor 1000 repeatedly (e.g., continuously) monitors the signal strength and updates the enablement or disablement of the direct communication accordingly. Thus, while the direct routing disclosed herein between two nodes may be enabled at a first time, the direct routing can be disabled and re-enabled at second and third times.

Referring back to FIG. 11, if the direct routing is not enabled (e.g., disabled, not enabled for the type of frame, unavailable due to lack of signal strength, etc.) for the destination node of the received frame(s) (block 1110), the signal strength monitor 1000 generates an indication that the governing network protocol is to be used to forward the frame(s) and control proceeds to block 1116. Otherwise, if the signal strength monitor 1000 determines that the direct routing is enabled for the destination node, a corresponding indication is generated and control proceeds to block 1112.

When control proceeds to block 1112, the example overrider 1012 sets the destination address to be the remote interface address of the destination address of the received frame (block 1112). In some examples, the overrider 1012 additionally designates the received frame(s) as a special type of frame (e.g., an ether frame) by, for example, setting a flag in the table 914 and/or another data structure associated with the corresponding frame(s) and/or node(s). With the overrider 1012 having replaced the destination information of the received frame(s) to cause the direct routing thereof, the example director communication enabler 822 bypasses the communication path defined by the governing network protocol and, instead, forwards the received frame(s) directly to the destination node (block 1114). Otherwise, if control has proceeded to block 1116, the communication path defined by the governing network protocol (e.g., spanning tree protocol) is used to forward the received frame(s) (block 1116). The example of FIG. 11 then ends (block 1118).

X. Example Multicast Direct Routing

In certain examples, to convey data over a playback network, multicast and unicast routing can be supported. Rather than a unicast message from one node to another node, a multicast message from one node to a plurality of nodes can be transmitted via direct routing if certain conditions are satisfied (e.g., allowable data type (e.g., audio data and so on), acceptable signal strength, appropriate bridge table information, and so on). For example, if a node is transmitting a message to a zone group (e.g., as a member of the group or as a distribution node providing content to the zone group), the node can multicast the message to some or all of the nodes in the group instead of or in addition to a direct unicast message to a single node.

For example, a zone player or other playback device transmits audio and playback timing information in messages over a network using a multi-cast message transmission methodology. In some examples, each of the messages includes a multicast address (or some other ID or identifying address) that is used to identify the multicast group or members of the multicast group for which the message is intended. Each device associated with the group monitors the messages on the network, and, when a group member detects a message with its address or a multicast group address to which the device belongs, the device receives and processes the contents of the message. It is understood, however, that the zone player or other playback device may make use of any convenient multicast or unicast (or other) message transmission methodology in transmitting the audio and playback timing information to other devices, for example.

In certain examples, audio and playback timing information is provided in the form of a series of frames, with each frame having a timestamp. The timestamp indicates a time, relative to the time indicated by a clock maintained by the playback device or some other designated reference device, at which the frame is to be played. Depending on the size or sizes of the messages used in the selected multi-cast message transmission methodology and the size or sizes of the frames, a message may contain one frame, or multiple frames, or, alternatively, a frame may extend across several messages. It is understood that the information included in the timestamp(s) may alternatively be provided by one device to other member playback devices in periodic or non-periodic intervals instead of, or in addition to, in a series of frames.

As disclosed above, each node (e.g., zone player or other media playback device) maintains one-hop wireless neighbor information in a neighbor table for unicast direct routing support. In certain examples, to support multicast direct routing, as well as unicast direct routing, each node also maintains information regarding whether any of its neighbors has a wired port in a forwarding state. In certain examples, a node may maintain n-hop "neighbor" information to facilitate direct routing if allowed (e.g., if a number of hops n to a target node via "direct" routing is less than a number of hops to the node via STP or other indirect routing protocol).

In certain examples, to facilitate multicast direct routing, each node advertises if it has a wired port in a forwarding state. For example, a node (e.g., a node 902-908) advertises that it has a wired port in a forwarding state using an independent message, through an IEEE 802.11 Information Element (IE) in existing discovery probes, and so on. Frames are sent as a broadcast to all active node wireless interface(s). For example, even if a wireless interface for a node is blocked according to a spanning tree protocol, the wireless interface can be reached by the advertising frame.

a. Example Multicast Frame Forwarding

To facilitate multicast routing to forward one or more message frames, a multicast address is selected. In certain examples, after a reboot, each node randomly selects a multicast IP address as its group address. The node uses this address as its multicast group address whenever the node works as a Group Coordinator (GC) and has more than one Group Member (GM).

Multicast frame forwarding can be applied or not applied to a message to be transmitted based on one or more rules and/or other criterion. For example, the GC uses multicast forwarding only if it has more than one GM in its zone. Otherwise, the node forwards the traffic to another node as a unicast message. Thus, the GC may determine a number of group members in its group and thereby determine whether to use multicast direct routing, unicast direct routing, forwarding according to STP, and so on.

During its course of operation, a node can be GC of more than one zone group. In certain examples, for all zones in which a node (e.g., a zone player or other media playback device) serves as a GC, that node uses the same address as its multicast group address for each group. In other examples, the GC may establish different group addresses to distinguish between its different groups.

In certain examples, traffic streamed from the Internet or network attached storage to the GC is delivered using a transmission control protocol (TCP). The GC then timestamps the frame (e.g., for synchronized play) and sends the frame to other GM(s). Traffic from the GC to GMs is delivered using a network protocol such as a user datagram protocol (UDP), etc.

b. Example Group Join

In a playback system, a node may dynamically join and disengage from one or more zones or zone groups. In certain examples, when a node (e.g., zone player or other media playback device 800, 902, 904, 906, 908) joins an existing zone, the joining node works as a GM. If the zone group has more than one GM, the GC informs each GM about a multicast group it is to join (e.g., through a UPnP message). Once a GM receives the information about the multicast group it is to join (e.g., an IP or MAC address, and so on), the node creates a socket to receive the multicast traffic.

Once the node knows a multicast address to join, the node sends its multicast membership information in the local area network (LAN) through one or more dedicated messages, for example. In certain examples, dedicated membership messages are sent with etherType set to 0x6970 and destination set to 01:0 E:58:DD:DD:DD. By setting bit 0 of the MAC address to 1, a multicast destination is indicated.

Dedicated messages used to configure group membership include a list of multicast group addresses to which the node is attempting to subscribe, such as a single multicast address. The source address of this message is set to the bridge ID of the node, for example.

The multicast membership message is forwarded throughout the LAN and is used to create a multicast forwarding entry at each node in the network (e.g., each zone player in the household, etc.). In certain examples, each node uses hashing to create a multicast forwarding entry for a multicast group address in a bridge table for the node. For each multicast forwarding entry, the node maintains a bridge port at which the node has received a membership request as well as a list of MAC addresses (e.g., bridge IDs in this case) that are subscribed to the multicast group.

c. Example Frame Forwarding

When a bridge or other node receives a frame (e.g., an Ethernet Layer 2 (L2) frame) with destination address set to the multicast group address, the node first checks its multicast forwarding table to find the port(s) associated with members subscribed to the multicast group. For a given outgoing port with GM(s), the frame is forwarded through the port according to one or more conditions. For example, the frame is forwarded to a multicast group member if the following conditions are met: 1) the outgoing port under consideration is in the forwarding state; 2) the outgoing port under consideration is not the port at which the node received the multicast frame in the first place (e.g., outgoing port is not equal to incoming port); and 3) for p2p ports, the other end of the tunnel is in the forwarding state.

In certain examples, if the port is a p2p port (e.g., a wireless STP link), the node sends a copy of the multicast data tunneled to the other end of the p2p port. If the port is not p2p, the node reviews the list of MAC addresses currently subscribed to the multicast group through the port and sends a unicast copy to each of the subscribed nodes. Thus, once a multicast frame hits a wired link, forwarding of the multicast frame from that point on is as a unicast frame.

The messaging process can be repeated at each intermediate hop in a network until the frame is delivered to all participating members.

d. Example of Group Disengagement

Zone players and/or other nodes may dynamically switch groups, sometimes only temporarily (e.g., for a certain zone configuration such as a scene or theme that is time- and/or other constraint-limited, etc.). When a device leaves or disengages from a zone group, port and/or other information enabling the device to be connected to and/or otherwise receive and process messages intended for the group are to be updated. In certain examples, when a GM switches its group, old port entries expire and are deleted after a period of time. In certain examples, a node sends a message to indicate that the node is leaving a group. In certain examples, a follow-up message is sent to announce a group to which the node now belongs (if any).

e. Example Reliability Determination

Given synchrony and/or other QoS constraints that may apply to a playback network, reliability of message delivery may be important. In certain examples, sequence numbers are used with UDP (unicast or multicast) messages and/or other format messages to help ensure reliable delivery of messages to GM(s). A GM can examine a message's sequence number to determine if it has missed delivery of a message, for example. If a GM misses a multicast frame (e.g., determined by checking sequence number), the node sends a negative acknowledgement to the GC requesting retransmission of the multicast frame (e.g., retransmitted as unicast), for example.

f. Example of Multicast Forwarding Network Operation

Figure 13:
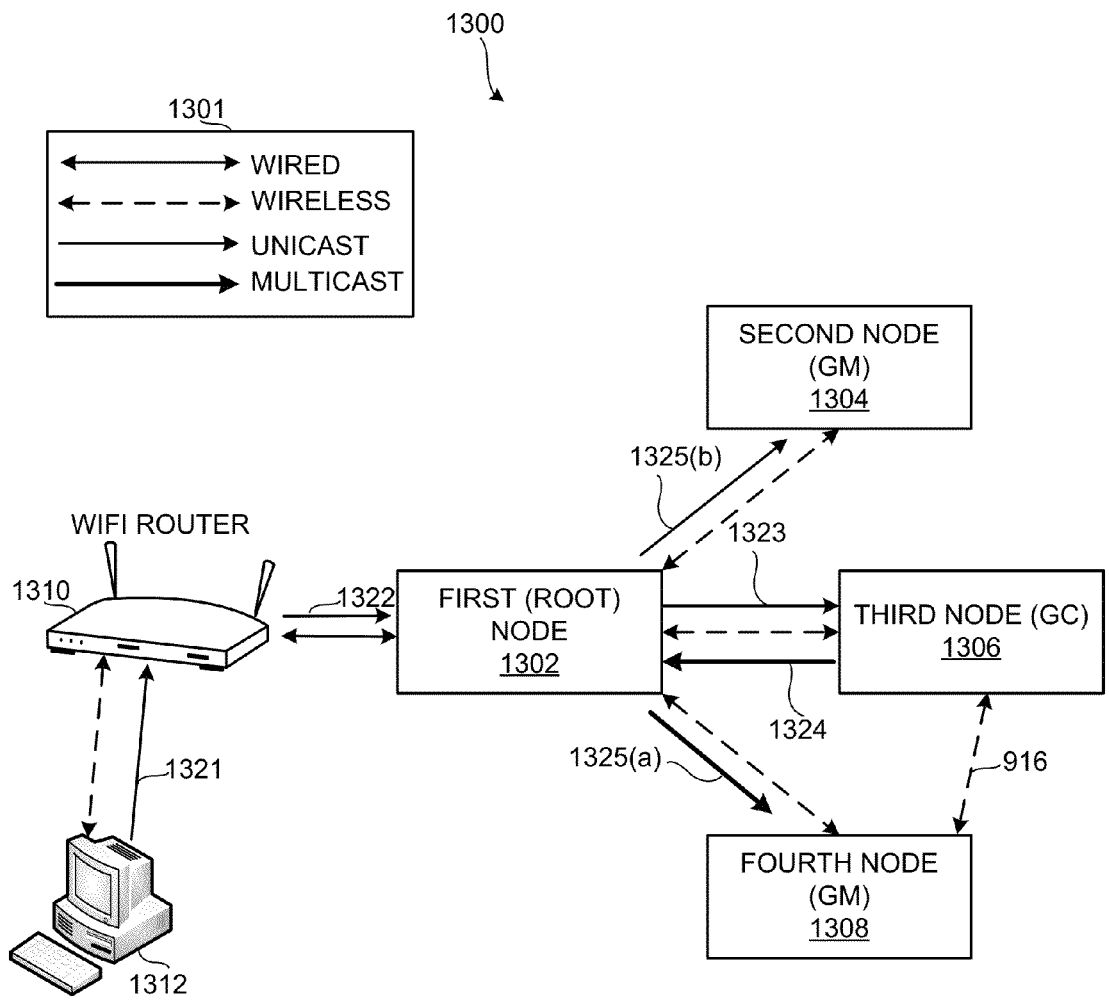
FIG. 13 illustrates an example network providing multicast frame forwarding.

FIG. 13 illustrates an example network 1300 providing multicast frame forwarding. The example network 1300 of FIG. 13 supports a combination of wired and wireless links and/or interfaces configured to convey unicast and/or multicast messages, as shown in the legend 1301. The example network 1300 includes four nodes 1302, 1304, 1306 and 1308 and a router 1310. In the illustrated example, the nodes 902-908 correspond to media playback devices, such as the zone players of FIGS. 1, 2A-C, 4, and/or 8. For the purpose of discussion below, zone player (ZP) has been used as a general term for all playback devices that can participate in a spanning tree. However, example methods and apparatus disclosed herein can be implemented in connection with any suitable type of device represented by the nodes 1302-1308 of FIG. 13. The example router 1310 is a Wi-Fi router that supports both wired and wireless communication. However, additional or alternative type(s) of routers can be utilized to facilitate communication in the network 1300.

In the example of FIG. 13, a first node 1302 (e.g., a zone player or other media playback device, etc.) is designated as a root of a spanning tree for the network 1300. The second node 1304, third node 1306, and fourth node 1308 have a direct link to the first node 1302. In the example network 1300, a link between the first node 1302 and the second node 1304, between the first node 1302 and the third node 1306, and between the first node 1302 and the fourth node 1308 are p2p wireless links.

In the example network 1300 of FIG. 13, the third node 1306 works as the GC with the second node 1304 and the fourth node 1308 operating as GMs. Since the group includes more than one GM, the third node 1306 informs the second node 1304 and the fourth node 1308 that the third node 1306 is going to use a multicast message to deliver traffic and corresponding multicast group information. Once the multicast information is in place (e.g., through join information sent from the second node 1304 and the fourth node 1308), each node in the network 1300 (e.g., a LAN) is aware of the currently active multicast group and members subscribed to the group.

Using the example network 1300 of FIG. 13, a user can play music through a device, such as a NAS server, storing media content. Music traffic is first sent as a unicast message to the third node 1306 using TCP. As illustrated in the example of FIG. 13, music or other media content is sent from a desktop controller 1312 to the router 1310 in a first unicast message 1321. The router 1310 relays the content message to the first node 1302 via a second unicast message 1322. The first node 1302 then sends the content message to the third node 1306 via a third unicast message 1323.

The third node 1306 timestamps the frame (e.g., for synchronized playback) and tries to deliver the frame for output using multicast messaging. The third node 1306 consults its multicast table to find list of ports that have members subscribed to the multicast group. In the example of FIG. 13, the third node 1306 discovers that it has two members (the second node 1304 and the fourth node 1308) for the multicast group, and the nodes 1304, 1308 are reachable through the same p2p port (e.g., the first node 1302). The third node 1306 then encapsulates the multicast frame in a p2p header and forwards the frame to the first node 1302 via a multicast message 1324.

When the first node 1302 receives the encapsulated frame of the multicast message 1324, the node 1302 removes the p2p header and checks the destination address of the frame. In the example of FIG. 13, the destination address is a multicast address. The first node 1302 checks its multicast forwarding table to find the list of ports having members subscribed to the multicast group. In this case, the first node 1302 determines that it has two p2p ports, a wireless port for the second node 1304 and a wireless port for the fourth node 1308. For these p2p ports, the first node 1302 encapsulates the frame in a p2p header and forwards the frame as a multicast message (e.g., a multicast message 1325(a) to the fourth node 1308 and a multicast message 1325(b) to the second node 1304. This process repeats until the frame is received by all group members (e.g., both the second node 1304 and the fourth node 1308), for example.

g. Example of Multicast Forwarding Optimization

Multicast forwarding may also suffer from triangular routing due to use of a spanning tree protocol. For example, in FIG. 13, the second node 1304 and the fourth node 1308 are neighbors of the third node 1306, but the multicast traffic has to flow through the first node 1302 because STP has blocked a direct link between the pairs a) third node 1306—second node 1304 and b) third node 1306—fourth node 1308 to help prevent routing loops.

While an example manner of implementing a direct routing multicast network 1300 has been illustrated in FIG. 13, one or more of the elements, processes and/or devices illustrated in FIG. 13 may be combined, divided, re-arranged, omitted, eliminated and/or implemented in any other way. Further, one or more elements, processes and/or devices of FIG. 13 may be implemented by hardware, software, firmware and/or any combination of hardware, software and/or firmware. When any of the appended claims are read to cover a purely software and/or firmware implementation, at least one of the components of the network 1300 of FIG. 13 are hereby expressly defined to include a tangible computer readable medium such as computer readable storage medium (e.g., a memory, DVD, CD, Blu-ray, etc., storing the software and/or firmware). Further still, the network 1300 of FIG. 13 may include one or more elements, processes and/or devices in addition to, or instead of, those illustrated in FIG. 13, and/or may include more than one of any or all of the illustrated elements, processes and devices.

Figure 14:
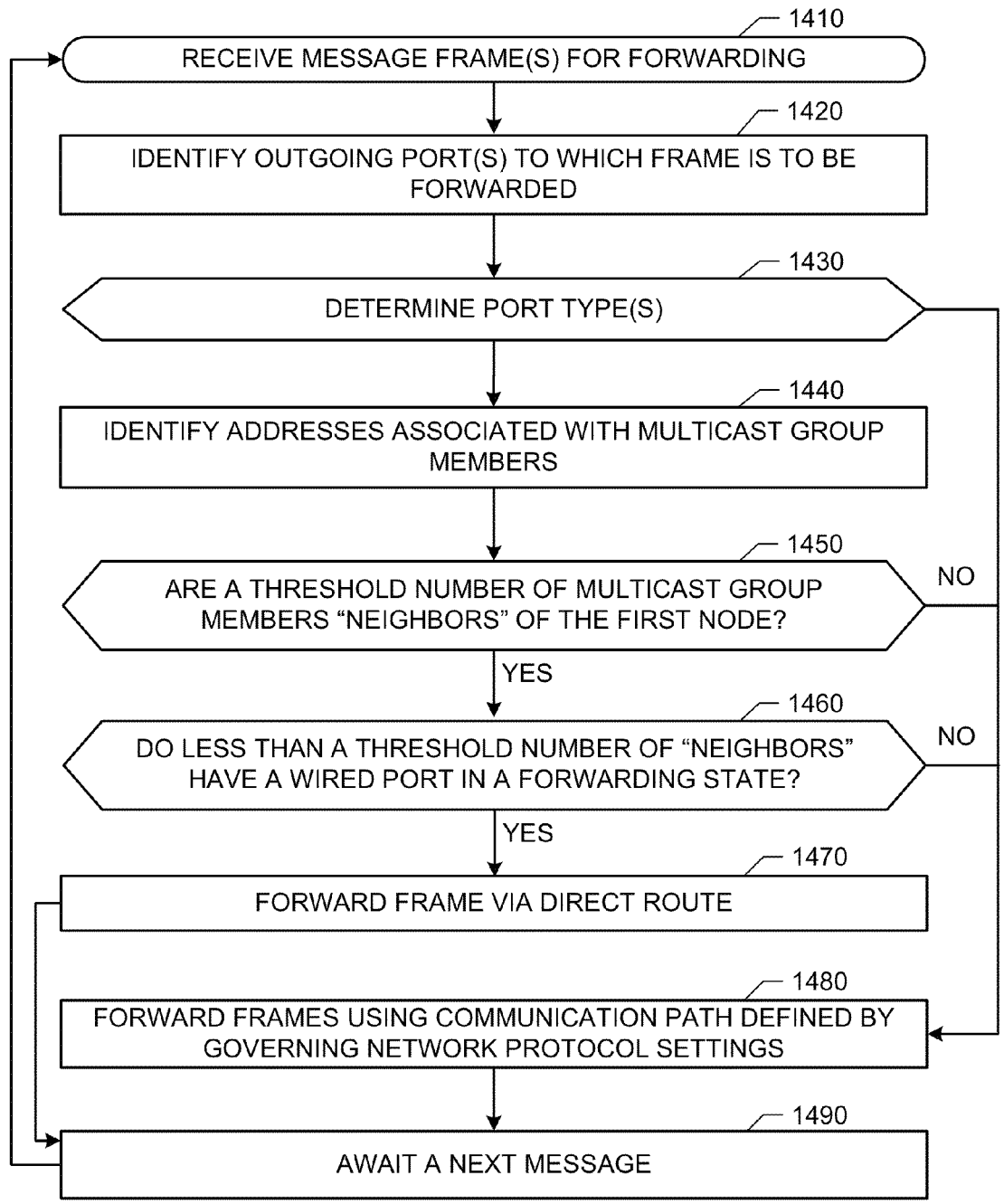
FIG. 14 shows a flowchart for an example method or process to enable direct routing optimization to forward multicast traffic in a network.

Flowcharts representative of example machine readable instructions for implementing and/or implementation with the example network of FIG. 13 is shown in FIG. 14. In the examples of FIG. 14, the machine readable instructions comprise a program for execution by a processor such as the processor 408 of FIG. 4. The program may be embodied in software stored on a tangible computer readable medium such as a CD-ROM, a floppy disk, a hard drive, a digital versatile disk (DVD), a Blu-ray disk, or a memory associated with the processor 408, but the entire program and/or parts thereof could alternatively be executed by a device other than the processor 408 and/or embodied in firmware or dedicated hardware. Further, although the example programs are described with reference to the flowcharts illustrated in FIG. 14, many other methods of implementing the example network 1300 may alternatively be used. For example, the order of execution of the blocks may be changed, and/or some of the blocks described may be changed, eliminated, or combined.

In certain examples, direct routing optimization can be applied for multicast message traffic as well as unicast traffic. As multicast group join information is forwarded throughout a network (e.g., a LAN), each zone player or other node in the network (e.g., a household or other environment) becomes aware of each active multicast group and the group's membership information. In certain examples, a node uses direct routing optimization to forward multicast traffic as described in conjunction with FIG. 14.

First, a message frame is received (block 1410). For example, a node on the network, such as the third node 1306 on the network 1300, receives a multicast message including an audio frame and/or timing information for relay and playback. In certain examples, a type of data (e.g., audio data, non-audio data, and so on) is examined to determine whether multicast direct routing should apply. In certain examples, an environmental condition (e.g., signal strength, port status, and so on) is examined to determine whether multicast direct routing should apply.

Assuming a node is eligible to consider multicast direct routing, a list of outgoing port(s) to which a multicast frame is to be forwarded is identified (block 1420). For these outgoing ports, the outgoing port under consideration should not be in a disabled state. That is, if the outgoing port is disabled, then wireless communication is not possible via that port. Additionally, the outgoing port under consideration is not the port at which the node received the multicast frame in the first place (e.g., outgoing port does not equal incoming port).

The node's ports are evaluated to determine type (block 1430). If at most "N" of a node's ports are legacy (non-p2p) ports, the node is not going to use multicast direct routing optimization. In certain examples, N is set to one (1). For example, if a majority of ports through which a message frame is to be sent are wired ports, multicast direct routing may not provide a benefit over the standard or default routing scheme (e.g., a STP-based routing scheme, etc.). However, if a majority of ports (or N less than a threshold, such as N<3) are wireless p2p ports and have an acceptable signal strength (e.g., signal strength for data transmission greater than a quality threshold), then multicast direct routing is facilitated to the non-legacy ports in the group.

For each outgoing port, the node identifies a list of addresses (e.g., MAC addresses) that are associated with members of the multicast group (block 1440). The node checks its neighbor table to evaluate whether (e.g., how many) members of the multicast group are its neighbors (or are within a certain threshold number of hops to qualify for direct routing (e.g., 2, 3, and so on)) (block 1450). For example, the node checks the neighbor table to determine if at most "M" of the multicast group members are not its neighbors. For example, M may be set to one (1).

The node checks the neighbor table to determine if at most "P" of the neighbor nodes have their wired port in a forwarding state (e.g., the port is receiving and sending data in normal operation) (block 1460). In certain examples, P is set to one (1). Nodes announce the state of their wired ports through management frames, for example. Thus, in certain examples, if a majority of nodes are neighbors (or otherwise located within a certain number of hops) and messages are to be forwarded via wireless p2p ports for a majority of nodes, then multicast direct routing is utilized with respect to those eligible nodes.

If the neighbor table checks are true, the node unicasts the frame to each "neighbor" node (block 1470). That is, when applying multicast direct routing optimization, a multicast destination address in each multicast frame may be replaced with a unicast destination address for each target node, for example. Otherwise, the node delivers multicast frames via a default or other "normal" routing protocol (e.g., using a spanning tree) (block 1480).

To prevent expiration of a bridge forwarding entry at a destination node due to multicast direct routing, multicast traffic can be periodically sent using a normal multicast forwarding tree (e.g., according to a governing STP). In certain examples, a simple network time protocol (SNTP) message transmitted periodically between GM and GC helps facilitate updating of a bridge forwarding entry.

The node then awaits a next message to repeat the routing process (block 1490).

XI. Conclusion

Thus, certain examples provide systems, methods and apparatus to improve message delivery in a network. Certain examples help to facilitate flexible, fast delivery of content on a playback network. Certain examples accommodate multicast and unicast frame forwarding via wired and/or wireless port connections.

An example method includes identifying, at a first playback device, a message including a data frame to be directed to a group of playback devices via a network protocol. The example method includes overriding the network protocol for the group of playback devices to transmit a unicast message via direct routing to each member of the group of playback devices that is a neighbor of the first playback device.

Certain examples provide a tangible computer readable storage medium including instructions that, when executed, cause a machine to identify a message including a frame of data to be directed to a group of playback devices via a network protocol. The example instructions, when executed, cause the machine to override the network protocol for the group of playback devices to transmit a unicast message via direct routing to each member of the group of playback devices that is a neighbor of the first playback device.

Certain examples provide a media playback device including a network interface to receive and transmit a data message; a memory to store the data message; and a processor. The example processor is configured to identify a message including a frame of data to be directed to a group of playback devices via a network protocol. The example processor is configured to override the network protocol for the group of playback devices to transmit a unicast message via direct routing to each member of the group of playback devices that is a neighbor of the first playback device.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As mentioned above, example methods or processes may be implemented using coded instructions (e.g., computer readable instructions) stored on a tangible computer readable medium such as a computer readable storage medium (e.g., hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information)). As used herein, the term tangible computer readable storage medium is expressly defined to include any type of computer readable storage medium and to exclude propagating signals. Additionally or alternatively, the example processes or methods may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/ or for caching of the information). As used herein, the term non-transitory computer readable storage medium is expressly defined to include any type of computer readable medium and to exclude propagating signals.

As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A method comprising:
    identifying, at a first playback device, a multicast message including a data frame to be directed to a group of playback devices via a network protocol;
    evaluate a number of outgoing ports of the network interface to identify a number of wired ports and a number of wireless ports; and
    based on the number of wired ports of the first playback device and an associated state of the wired ports, override the network protocol for the group of playback devices to enable direct routing to transmit a unicast message based on the multicast message via direct routing to each member of the group of playback devices that is a neighbor of the first playback device and maintaining the network protocol to transmit the multicast message via the network protocol to each member of the group of playback devices that is not a neighbor of the first playback device.

2. A method as defined in claim 1, wherein the direct routing comprises a wireless link.

3. A method as defined in claim 2, further comprising preventing the overriding of the network protocol when a signal strength of the wireless link of the direct routing is less than a threshold.

4. A method as defined in claim 1, wherein the network protocol comprises a spanning tree protocol.

5. A method as defined in claim 1, further comprising periodically transmitting a message including a frame of data using the network protocol regardless of whether the member is a neighbor of the first playback device.

6. A method as defined in claim 1, further comprising determining a data type of the message, wherein the data type is to be a further condition to override the network protocol to transmit the message including a frame of data as a unicast message via direct routing from the first playback device to the member.

7. A method as defined in claim 1, wherein a neighbor is identified based on a logical distance between the first playback device and the member, the logical distance comprising at least one of the following: one hop and multiple hops less than a threshold.

8. A method as defined in claim 1, further comprising enabling direct routing based on whether a neighbor of the first playback device has a wired port in a forwarding state.

9. A non-transitory computer readable storage medium comprising instructions that, when executed, cause a machine to:
identify a multicast message including a frame of data to be directed to a group of playback devices via a network protocol, the group of playback devices including a first playback device;
evaluate a number of outgoing ports to identify a number of wired ports and a number of wireless ports; and
based on the number of wired ports and an associated state of the wired ports, override the network protocol for the group of playback devices to enable direct routing to transmit a unicast message based on the multicast message via direct routing to each member of the group of playback devices that is a neighbor of the first playback device and maintain the network protocol to transmit the multicast message via the network protocol to each member of the group of playback devices that is not a neighbor of the first playback device.

10. A non-transitory computer readable storage medium as defined in claim 9, wherein the protocol configuration comprises an entry of a spanning tree protocol table associated with the first playback device.

11. A non-transitory computer readable storage medium as defined in claim 9, wherein the instructions are to cause the machine to enable periodically transmitting of the message using the network protocol regardless of whether the member is a neighbor of the first playback device.

12. A non-transitory computer readable storage medium as defined in claim 9, wherein the instructions are to cause the machine to determine a data type of the message, wherein the data type is to be a further condition to override the network protocol to transmit the message as a unicast message via direct routing from the first playback device to the member.

13. A non-transitory computer readable storage medium as defined in claim 9, wherein a neighbor is identified based on a logical distance between the first playback device and the member, the logical distance comprising at least one of the following: one hop and multiple hops less than a threshold.

14. A non-transitory computer readable storage medium as defined in claim 9, wherein the instructions are to cause the machine to enable direct routing based on whether a neighbor of the first playback device has a wired port in a forwarding state.

15. A first media playback device, comprising:
a network interface to receive and transmit a data message;
a memory to store the data message; and
a processor configured to:
identify a multicast message including a frame of data to be directed to a group of playback devices via a network protocol, the group of playback devices including the first media playback device;
evaluate a number of outgoing ports to identify a number of wired ports and a number of wireless ports; and
based on the number of wired ports and an associated state of the wired ports, override the network protocol for the group of playback devices to enable direct routing to transmit a unicast message based on the multicast message via direct routing to each member of the group of playback devices that is a neighbor of the first media playback device and maintain the network protocol to transmit the multicast message via the network protocol to each member of the group of playback devices that is not a neighbor of the first media playback device.

16. A first media playback device as defined in claim 15, wherein enabling the direct routing comprises replacing a destination port of the data message with a port identifier associated with a second media playback device associated with the member.

17. A first media playback device as defined in claim 15, wherein the processor is configured to prohibit the overriding when the message includes a maintenance frame.

18. A first media playback device as defined in claim 15, wherein the first media playback device is to periodically enable transmission of the message using the network protocol regardless of whether the member is a neighbor of the first media playback device.

19. A first media playback device as defined in claim 15, wherein the network protocol comprises a spanning tree protocol network.

* * * * *